US012577129B2

(12) United States Patent
Chang

(10) Patent No.: US 12,577,129 B2
(45) Date of Patent: Mar. 17, 2026

(54) COLOR REMOVAL WITH ZIPGEM FILTRATION MEDIA FOR WATER AND WASTEWATER TREATMENT

(71) Applicant: University of Central Florida Research Foundation, Inc., Orlando, FL (US)

(72) Inventor: Ni-Bin Chang, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 393 days.

(21) Appl. No.: 18/303,973

(22) Filed: Apr. 20, 2023

(65) Prior Publication Data

US 2023/0339783 A1      Oct. 26, 2023

Related U.S. Application Data

(60) Provisional application No. 63/333,310, filed on Apr. 21, 2022.

(51) Int. Cl.
| | |
|---|---|
| *C02F 1/28* | (2023.01) |
| *B01J 20/02* | (2006.01) |
| *B01J 20/10* | (2006.01) |
| *B01J 20/28* | (2006.01) |
| *C02F 101/30* | (2006.01) |

(52) U.S. Cl.
CPC ........... *C02F 1/288* (2013.01); *B01J 20/0225* (2013.01); *B01J 20/106* (2013.01); *B01J 20/28011* (2013.01); *B01J 20/28059* (2013.01); *C02F 1/281* (2013.01); *C02F 2101/308* (2013.01)

(58) Field of Classification Search
CPC .... C02F 1/288; C02F 1/281; C02F 2101/308; B01J 20/0225; B01J 20/106; B01J 20/28011; B01J 20/28059
See application file for complete search history.

(56) References Cited

U.S. PATENT DOCUMENTS

| | | | |
|---|---|---|---|
| 5,360,551 A | 11/1994 | Weber | |
| 5,766,485 A | 6/1998 | Lind et al. | |
| | (Continued) | | |

OTHER PUBLICATIONS

Ordonez, D., et al., "Color removal for large-scale interbasin water transfer: experimental comparison of five sorption media", Environmental Research, 212, 113208. Available online Mar. 31, 2022. (Year: 2022).*

(Continued)

*Primary Examiner* — Benjamin L Lebron
(74) *Attorney, Agent, or Firm* — Andrew Behrens; Trenam Law

(57) ABSTRACT

Described herein relates to an optimum, low maintenance and low-cost filtration media which may be implemented near a source water location as a pretreatment to remove tannic acid and/or humic acid (color) from dissolved natural organic matter (NOM) (i.e., tannic acid, humic acid) to impede the prompt production of disinfection by-products collectively termed trihalomethanes in drinking water treatment processes. In an embodiment, the filtration media may comprise a composition having a ratio of at least 83% sand, at most 5% clay, at most 6% ZVI and at most 6% perlite by percent volume.

14 Claims, 27 Drawing Sheets
(26 of 27 Drawing Sheet(s) Filed in Color)

(56)                    References Cited

U.S. PATENT DOCUMENTS

| | | | |
|---|---|---|---|
| 5,961,838 | A | 10/1999 | Braden et al. |
| 6,059,978 | A | 5/2000 | Pacifici et al. |
| 2016/0318772 | A1 | 11/2016 | Vohra |
| 2020/0239332 | A1* | 7/2020 | Kevern .................. B01D 39/06 |

OTHER PUBLICATIONS

Perlite Institute, "Perlite filter aid for recreational water filtration". (Year: 2021).*

Nusrat Tara et al. "Nano-Engineered Adsorbent for the Removal of Dyes from Water: A Review" Current Analytical Chemistry. 2020, pp. 14-40, 16.

V.Suba et al. "Novel Adsorbents for the Removal of Dyes and Metals from Aqueous Solution—A Review" Journal of Advanced Physics. 2016, pp. 277-294, vol. 5.

Aseel M. Aljeboree et al. "Kinetics and equilibrium study for the adsorption of textile dyes on coconut shell activated carbon" Arabian Journal of Chemistry. 2017, pp. S3381-S3393.10.

Min-Yun Chang et al. "Adsorption of tannic acid, humic acid, and dyes from water using the composite of chitosan and activated clay" Journal of Colloid and Interface Science. 2004, pp. 18-25, 278.

Sobhan Chatterjee et al. "Selective and Recyclable Congo Red Dye Adsorption by Spherical Fe3O4 Nanoparticles Functionalized with 1,2,4,5-Benzenetetracarboxylic Acid" Scientific Reports Natureresearch. 2020, pp. 1-12.

Yuehua Deng et al. "Highly efficient removal of tannic acid from aqueous solution by chitosan-coated attapulgite" Chemical Engineering Journal. 2012, pp. 300-306. 181-182.

Mehmet Dogan et al. "Removal of methyl violet from aqueous solution by perlite" Journal of Colloid and Interface Science. 2003, pp. 32-41, 267.

Mehmet Dogan et al. "Adsorption of Methylene Blue From Aqueous Solution Onto Perlite" Water, Air, and Soil Pollution. 2000, pp. 229-248, 120.

Gamal Owes El-Sayed "Removal of methylene blue and crystal violet from aqueous solutions by palm kernel fiber" Desalination. 2011, pp. 225-232, 272.

A. Ghribi et al. "Modeling of Fixed Bed Adsorption: Application to the Adsorption of an Organic Dye" Asian Journal of Textile. 2011, pp. 161-171, 4.

Stephanie L. Gora et al. "Adsorption of natural organic matter and disinfection byproduct precursors from surface water ponto TiO2 nanoparticles: pH effects, isotherm modelling and implications for using TiO2 for drinking water treatment" Chemosphere. 2017, pp. 363-370, 174.

J. Kaal, K.G.J. Nierop et al. "Retention of tannic acid and condensed tannin by Fe-oxide-coated quartz sand" Journal of Colloid and Interface Science. 2005, pp. 72-79, 287.

Abida Kausar et al. "Dyes adsorption using clay and modified clay: A review" Journal of Molecular Liquids. 2018, pp. 395-407, 256.

Y. M. Li et al. "Iron-Tannic Acid Nanocomplexes: Facile Synthesis and Application for Removal of Methylene Blue From Aqueous Solution" Digest Journal of Nanomaterials and Biostructures. 2016, pp. 1045-1061. vol. 11, No. 4.

J. Lowe et al. "Application of ultrafiltration membranes for removal of humic acid from drinking water" Desalination. 2008, pp. 343-354, 218.

R.S.Mane et al. "Removal of Colour (dyes) from textile effluent by adsorption using Orange and Banana peel" International Journal of Engineering Research and Applications. 2012, pp. 1997-2004. vol. 2, Issue 3.

Anu Matilainen et al. "Natural organic matter removal by coagulation during drinking water treatment: A review" Advances in Colloid and Interface Science. 2010, pp. 189-197, 159.

Ladda Meesuk et al. "The use of perlite to remove dark colour from repeatedly used palm oil" ScienceAsia. 2010, pp. 33-39, 36.

Yasmen A. Mustafa et al. "Utilization of Thomas Model to Predict the Breakthrough Curves for Adsorption and Ion Exchange" Journal of Engineering. 2010, pp. 6206-6222. No. 4 vol. 16.

Preeti Sagar Nayak et al. "Instrumental characterization of clay by XRF, XRD and FTIR" Bull. Mater. Sci. Jun. 2007, pp. 235-238. vol. 30, No. 3.

P. Prema et al. "Color removal efficiency of dyes using nanozerovalent iron treatment" Toxicological & Environmental Chemistry. 2011, pp. 1908-1917. vol. 93, No. 10.

K. Rambabu et al. "Effective treatment of dye polluted wastewater using nanoporousCaCl2modified polyethersulfone membrane" Process Safety and Environmental Protection. 2019, pp. 266-278, 124.

K C Lakshmi Narayan Rao et al. "Colour removal from a dyestuff industry effluent using activated carbon" Indian Journal of Chemical Technology. 1994, pp. 13-19, vol. 1.

Stephen D. Richardson et al. "Use of Rhodamine Water Tracer in the Marshland Upwelling System" Ground Water. Oct. 2004, pp. 678-688. vol. 42, No. 5.

Diovani L. Rossatto et al. "Volcanic rock powder residues as precursors for the synthesis of adsorbents and potential application in the removal of dyes and metals from water" Environmental Science and Pollution Research. 2022, pp. 25685-25693.

Silvia C.R. Santos et al. "Waste metal hydroxide sludge as adsorbent for a reactive dye" Journal of Hazardous Materials. 2008, pp. 999-1008, 153.

Aditya Sharma et al."Adsorption of textile wastewater on alkali-activated sand" Journal of Cleaner Production. 2019, pp. 23-32, 220.

Yang Shengguang et al. "Effect of Algae and Water on Water Color Shift" Chin. J. Oceanol. Limnol. 1991, pp. 49-46. vol. 9, No. 1.

Kunwar P. Singh et al. "Color Removal from Wastewater Using Low-Cost Activated Carbon Derived from Agricultural Waste Material" Ind. Eng. Chem. Res. 2003, pp. 1965-1976, 42.

Rajeshwari Sivaraj et al. "Orange peel as an adsorbent in the removal of Acid violet 17 (acid dye) from aqueous solutions" Waste Management. 2001, pp. 105-110, 21.

Chencheng Sun et al. "Adsorption removal of tannic acid from aqueous solution by polyaniline: Analysis of operating parameters and mechanism" Journal of Colloid and Interface Science. 2017, pp. 175-181, 487.

Gang Sun et al. "Sunflower Stalks as Adsorbents for Color Removal from Textile Wastewater" Ind. Eng. Chem. Res. 1997, pp. 808-812, 36.

Bharathi Kandaswamy Suyamboo et al. "Equilibrium, Thermodynamic and Kinetic Studies on Adsorption of a Basic Dye by Citrullus Lanatus Rind" Iranica Journal of Energy & Environment. 2012, pp. 23-34, 3.

Surbhi Tak et al "Natural organic matter as precursor to disinfection byproducts and its removal using conventional and advanced processes: state of the art review" Journal of Water and Health. 2018, pp. 681-703, 16.5.

Yue Teng et al. "Preparation of Attapulgite/CoFe2O4 Magnetic Composites for Efficient Adsorption of Tannic Acid from Aqueous Solution" International Journal of Environmental Research and Public Health. 2016, pp. 1-17, 16.

V. Vadivelan et al. "Equilibrium, kinetics, mechanism, and process design for the sorption of methylene blue onto rice husk" Journal of Colloid and Interface Science. 2005, pp. 90-100, 286.

Jianzhi Wang et al. "One-step fabrication of functionalized magnetic adsorbents with large surface area and their adsorption for dye and heavy metal ions" Dalton Transactions. 2014, pp. 11637-11645.

Jiahong Wang et al. "Tannic acid adsorption on amino-functionalized magnetic mesoporous silica" Chemical Engineering Journal. 2010, pp. 10-16, 165.

Yunling Wang et al. "Phylogeny of Dinoflagellate Plastid Genes Recently Transferred to the Nucleus Supports a Common Ancestry with Red Algal Plastid Genes" J Mol Evol. 2008, pp. 175-184. 66.

Syieluing Wong et al. "Effective removal of anionic textile dyes using adsorbent synthesized from coffee waste" Scientific Reports NatureResearch. 2020, pp. 1-14.

(56)  References Cited

OTHER PUBLICATIONS

Kiong-Feng Zhou et al. "Ultra-high synergetic intensity for humic acid removal by coupling bubble discharge with activated carbon" Journal of Hazardous Materials. 2021, pp. 1-10, 403.

* cited by examiner

COLOR REMOVAL WITH ZIPGEM FILTRATION MEDIA FOR WATER AND WASTEWATER TREATMENT

CROSS-REFERENCE TO RELATED APPLICATIONS

This nonprovisional application claims the benefit of U.S. Provisional Patent Application No. 63/333,310 entitled "COLOR REMOVAL WITH ZIPGEM FILTRATION MEDIA FOR WATER AND WASTEWATER TREATMENT" filed Apr. 21, 2022 by the same inventor, all of which is incorporated herein by reference, in its entirety, for all purposes.

BACKGROUND OF THE INVENTION

1. Field of the Invention

This invention relates, generally, to media used to improve efficiencies of contaminant removal from fluids, such as water sources. More specifically, it relates to a synergistic zero-valent-iron and perlite based green sorption media composition that is used to remove color from fluid.

2. Brief Description of the Prior Art

The increasing needs of drinking water due to population growth has spurred a need to find new tap water sources. However, these large-scale tap water sources are often discolored. Natural or synthetic color present in aquatic systems can occur from dyes from domestic or industrial wastewater (Tara et al., 2020), dissolved natural organic matter (hereinafter "NOM") from plant species (Kutser et al., 2005), and algae (Shengguang et al., 1991). More specifically, NOM including humic, fulvic, and tannic acids (Darko et al., 2014) can result in a yellow, red, brown and/or gray color in aquatic system. Humic and fulvic acids are the final products from the natural decay of plants and animals while tannin acid mostly occurs from leaching of twigs and swelling of certain trees including chestnut and oak trees. While these organic acids are beneficial to soil for agricultural processes, they can cause color contamination in water bodies. Therefore, they can affect the ability of these water bodies to be used as drinking water sources as they are precursors to disinfectant by-products (hereinafter "DBPs") after drinking water treatment (EPA, 2012; Ahamed et al., 2019). For this reason, the US Environmental Protection Agency (hereinafter "EPA") has regulated color concentration in drinking water to 15 Pt—Co units (e.g., visual color on the Platinum-Cobalt Scale) under the secondary drinking water standards (Dietrich and Burlingame, 2015).

DBPs are unintentional by-products resulting from the interaction of disinfectants like chlorine with NOM (Tak and Vellanki, 2018). Trihalomethanes, halo acetic acids, formaldehyde, and acetaldehyde are some of the commonly found DBPs (Krasner et al., 1989; Palmstrom et al., 1988). The occurrence of DBPs in drinking water can cause adverse effects on human health, (Fawell et al., 1997) including increasing risk of bladder cancer (Li and Mitch, 2018), and influencing reproduction, which can result in birth defects (Wigle, 1998). The removal of DBP precursors (e.g., NOMs) within drinking water treatment facilities typically requires coagulation, microfiltration (Bottino et al., 2001) or adsorption (Gora and Andrews, 2017; Sun et al., 2017). Given such complicated treatment processes, the removal of color from the natural aquatic sources utilized as drinking water is of importance as it can lower the treatment cost and minimize the emergence of DBPs.

Currently there are four different ways to remove tannic or humic acids (e.g., color) including 1) photocatalytic methods; 2) coagulation; 3) microfiltration; and 4) adsorption. The first three methods are relatively expensive and require sophisticated control schemes.

The removal of NOM (e.g., tannic and humic acid) and the degradation of dyes (e.g., color) by photocatalytic methods is an effective approach. In the photocatalytic process, heterogeneous photocatalysis involves the irradiation of semiconductor catalysts (e.g., $TiO2$, $ZnO$, $WO3$, $Fe_2O_3$, $CdO$, $CdS$, $SnO_2$, etc.) with a light source (e.g., ultraviolet (UV), sunlight, or artificial light) to generate highly reactive oxygen species (ROS) (e.g., $\cdot OH$, $O_2\cdot{-}$) for the subsequent mineralization of long chain or short chain organic pollutants. An example is the degradation of dyes, detergents, and organic acids by $TiO_2$ nanofilms (Albu et al., 2007).

As to the coagulation, the most common coagulates are aluminum and iron salts. Aluminum and iron salt when added to water dissolve negatively into particle trivalent forms (e.g., $Al^{3+}$ and $Fe^{3+}$) which allows the attachment to negative charged particles. Given the composition of NOM, its removal mechanism encompasses charge neutralization, entrapment, adsorption, and complexation with coagulant metal ions into the insoluble particles. Besides, the use of ferric salts has increased, with ferric chloride (i.e., $FeCl_3$) and ferric sulphate (i.e., $Fe(SO_4)_3$) being the most common alternatives (Matilainen et al., 2010). Furthermore, membrane filtration is an alternative physical treatment that can be used to remove color from source water or wastewater. The use of a flat ceramic microfiltration membrane made of natural perlite as the base material showed turbidity removal above 96% from industrial wastewater (Saja et al., 2018).

Adsorption methods are relatively easier than the previous three methods. Activated Carbon (hereinafter "AC") filter is the most common method to remove color from water and wastewater due to its simplicity and regeneration potential (Rao and Krishnaiah, 1994; Singh et al., 2003). This conventional treatment is designed to absorb particles and organic contaminants in drinking water that may result in bad tastes and odors. The utilization of AC in early stage has expanded to the innovated use of agricultural waste (Suba and Rathika, 2016). Sun and Xu (1997) revealed that sunflower stalks have a maximum adsorption potential of 105 and 317 $mg\cdot g^{-1}$ to remove basic dyes, Methylene Blue and Basic Red 9, respectively. Other innovated agricultural waste materials have been studied including mango peels (Jawad et al., 2017), rice husk (Vadivelan and Kumar, 2005), palm kernel shell (El-Sayed, 2011), coconut shell (Aljeboree et al., 2017), and banana and orange peels (Mane and Bhusari, 2012). The removal of humic acid by AC has been previously studied, where it showed a 98.9% removal of humic acid by a combined system of plasma and AC adsorption, after 90 minutes. Furthermore, it has been reported that AC had a maximum color removal efficiency of 90.72% with $Fe^0$ synthesized nanoparticles of size 16.64 nm. (Prema et al., 2011) Moreover, a polysilicate aluminum magnesium and cationic polyacrylamide flocculant have been successfully designed and have been able to obtain turbidity and color removal above 98% at optimum in drinking water. (Ma et al., 2019)

Additionally, other materials have been implemented for color removal, including clay to remove tannic and humic acid (Chang and Juang, 2004), where the maximum adsorption capacity was reported to be 153 $mg\cdot g^{-1}$ and 28.3 $mg\cdot g^{-1}$

US 12,577,129 B2

3 for tannic and humic acid correspondingly. Moreover, the adsorption of tannic and humic acid to activated clay follows pseudo-first order model and can be best model by intraparticle diffusion given that they are denser solids and have better mass transfer blockage in comparison with other absorbents (Chang and Juang, 2004).

The use of membranes to remove color and dyes have also been investigated. Rambabu et al. (2019) studied the dye rejection potential of a polyethersurfone nano-porous membrane modified with calcium chloride. A 95% rejection of Congo Red dye with the polyethersurfone nano-porous membrane was observed.

Perlite is a soil amendment derived from volcanic rock usually formed from siliceous lava or ash. Natural perlite is usually grey, but it can also be green, red, blue, or brown; yet after heating it usually takes on a white color. The chemical formula of perlite is $Al_2CaFe_2K_2MgNa_2O_{12}Si$ and the molecular weight is 574.29 $g \cdot mol^{-1}$; hence it is natural sodium-potassium-aluminum-silicate. The use of perlite and volcanic rock has also been studied for the removal of dyes from aqueous solutions (Rossatto et al., 2021). Dogan et al. (2000) examined the adsorption of methylene blue from aqueous solutions to unexpanded and expanded perlite samples activated by $H_2SO_4$ and NaCl solutions to remove cationic dyes. Their results indicated that perlite can be used for removal of methylene; a better removal efficacy was observed from unexpanded perlite. Meesuk and Seammai (2010) suggested that expanded perlite can be used to remove dark color from spent palm oil via physical mechanism and can also remove benzo(a)pyrene from the palm oil. Although the adsorption of tannic acid onto perlite has not been broadly explored, the adsorption efficiency of humic substances onto expanded perlite was investigated by Chassapis et al. (2010). Chassapis et al. (2010) indicated that the adsorption of humic substance stems involved Coulombic attraction forces related to the positively charged humic substances and negative sites of the perlite (i.e., aluminosilicate).

Accordingly, what is needed is an improved and cost-effective approach to removing color from water sources. However, in view of the art considered as a whole at the time the present invention was made, it was not obvious to those of ordinary skill in the field of this invention how the shortcomings of the prior art could be overcome.

SUMMARY OF THE INVENTION

The long-standing but heretofore unfulfilled need, stated above, is now met by a novel and non-obvious invention disclosed and claimed herein. In an aspect, the present disclosure pertains to a filtration media. In an embodiment the filtration media may comprise: (a) at least one silicon atom; (b) at least one aluminum atom; and (c) at least one zero-valence-iron (hereinafter "ZVI") atom. In this embodiment, the at least one ZVI atom may be chemically bonded to at least one silicon atom of at least one grain of perlite, such that at least one ZVI-perlite structure may be formed. Additionally, the at least one ZVI-perlite structure may then be chemically bonded to at least one alternative silicon atom of at least one grain of sand, such that at least one quartz structure may be formed. In this embodiment, the at least one ZVI atom may be configured to be disposed about at least a portion of a surface of the at least one quartz structure. Moreover, in this embodiment, the at least one ZVI-coated quartz structure may be metallically bonded to at least one aluminum atom, such that an aluminum-doped ZVI-quartz construct may be formed. Furthermore, in this embodiment, the aluminum-doped ZVI-quartz construct may further comprise at least one potassium atom and/or at least one calcium atom, and/or the aluminum-doped ZVI-quartz construct may comprise a heterogenous morphological structure.

In some embodiments, the ratio of the at least one ZVI atom to the at least one grain of sand within the aluminum-doped ZVI-quartz construct may be at most 0.071 by percent volume. In addition, in these other embodiments, the aluminum-doped ZVI-quartz construct may comprise a composition ratio of at least 85% sand, at most 5% clay, at most 6% ZVI, and at most 4% perlite by percent volume.

In some embodiments, the aluminum-doped ZVI-quartz construct may comprise a surface area of at most 3.00 $m^2 \cdot g^{-1}$. In this manner, the aluminum-doped ZVI-quartz construct may be configured to be hydraulicly conductive and/or highly porous. As such, in these other embodiments, the aluminum-doped ZVI-quartz construct may comprise a porosity of at least 29.0% of percent surface area.

In some embodiments, the aluminum-doped ZVI-quartz construct may comprise a density of at least 2.50 $g \cdot cm^{-3}$. In addition, the aluminum-doped ZVI-quartz construct may be electrochemically stable and/or hydrophobic.

Another aspect of the present disclosure pertains to a method of optimizing a color removal reaction within a water sample. In an embodiment, the method may comprise: (a) incorporating a filtration media into the water sample, the filtration media comprising: (i) at least one silicon atom; (ii) at least one aluminum atom; and (iii) at least one zero-valence-iron (hereinafter "ZVI") atom. In this embodiment, the at least one ZVI atom may be chemically bonded to at least one silicon atom of at least one grain of perlite, such that at least one ZVI-perlite structure may be formed. Additionally, the at least one ZVI-perlite structure may then be chemically bonded to at least one alternative silicon atom of at least one grain of sand, such that at least one quartz structure may be formed. In this embodiment, the at least one ZVI atom may be configured to be disposed about at least a portion of a surface of the at least one quartz structure. Moreover, in this embodiment, the at least one ZVI-coated quartz structure may be metallically bonded to at least one aluminum atom, such that an aluminum-doped ZVI-quartz construct may be formed. As such, in this embodiment, the incorporation of the filtration media to the water sample thereof may optimize the color removal reaction within the water sample.

In some embodiments, the aluminum-doped ZVI-quartz construct may be configured to maintain an effluent concentration below at least 40 color units of Pt—Co. In this manner, in these other embodiments, the aluminum-doped ZVI-quartz construct may be configured to operate continuously in the water sample for at least 14,000 minutes.

As such, in some embodiments, the aluminum-doped ZVI-quartz construct may be configured to inhibit ponding and/or clogging within at least one pour of the aluminum-doped ZVI-quartz construct for at least 40,000 minutes. In addition, the aluminum-doped ZVI-quartz construct may be configured to maintain an adsorption capacity of at least 25.0 mg of Pt—Co·g$^{-1}$ during the color removal reaction.

Furthermore, an additional aspect of the present disclosure pertains to a method of synthesizing a filtration media. In an embodiment, the method may comprise: (a) pretreating at least one iron atom, such that the at least one iron atom may comprise zero-valence (hereinafter "ZVI"); (b) chemically bonding at least one silicon atom of at least one grain of perlite to the at least one ZVI atom to form a ZVI-perlite structure; (c) chemically bonding at least one alternative silicon atom of at least one grain of sand to the ZVI-perlite structure to a quartz structure, such that the at least one ZVI atom may be disposed about at least a portion of a surface of the quartz structure; and (d) metallically bonding at least one aluminum atom to the ZVI-coated quartz structure to form the filtration media which is an aluminum-doped ZVI-quartz construct.

In some embodiments, heat treatment may be used to chemically bond the at least one grain of perlite to the at least one grain of sand. Additionally, the heat treatment may be used to chemically bond the at least one ZVI atom to the at least one grain of perlite, and furthermore, in these other embodiments the heat treatment may be used to chemically bond the at least one aluminum atom to the at least one ZVI-coated quartz structure.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not restrictive.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

For a fuller understanding of the invention, reference should be made to the following detailed description, taken in connection with the accompanying drawings, in which:

FIG. 5I is a plot illustrating a dynamic color removal efficiency curve for 439 ZIPGEM, according to an embodiment of the present disclosure.

DETAILED DESCRIPTION OF THE INVENTION

Figure 1A:
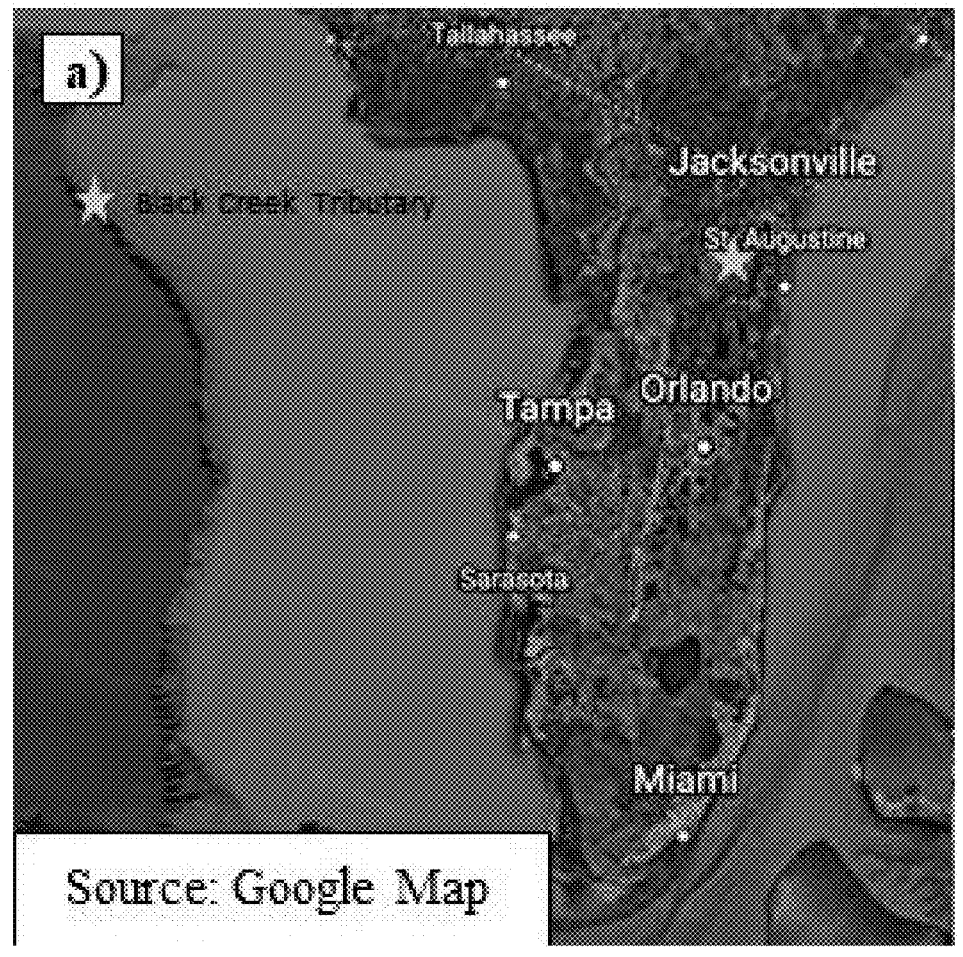
FIG. 1A is an aerial photograph comprising a marked location of Black Creek Tributary, according to an embodiment of the present disclosure.

In the following detailed description of the preferred embodiments, reference is made to the accompanying drawings, which form a part thereof, and within which are shown by way of illustration specific embodiments by which the invention may be practiced. It is to be understood that one skilled in the art will recognize that other embodiments may be utilized, and it will be apparent to one skilled in the art that structural changes may be made without departing from the scope of the invention. Elements/components shown in diagrams are illustrative of exemplary embodiments of the disclosure and are meant to avoid obscuring the disclosure. Any headings, used herein, are for organizational purposes only and shall not be used to limit the scope of the description or the claims. Furthermore, the use of certain terms in various places in the specification, described herein, are for illustration and should not be construed as limiting.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. The appearances of the phrases "in one embodiment," "in an embodiment," "in embodiments," "in alternative embodiments," "in an alternative embodiment," or "in some embodiments" in various places in the specification are not necessarily all referring to the same embodiment or embodiments. The terms "include," "including," "comprise," and "comprising" shall be understood to be open terms and any lists that follow are examples and not meant to be limited to the listed items.

Definitions

As used in this specification and the appended claims, the singular forms "a," "an," and "the" include plural referents unless the content clearly dictates otherwise. As used in this specification and the appended claims, the term "or" is generally employed in its sense including "and/or" unless the context clearly dictates otherwise.

As used herein, the term "about" or "roughly" means approximately or nearly and in the context of a numerical value or range set forth means±15% of the numerical.

All numerical designations, including ranges, are approximations which are varied up or down by increments of 1.0, 0.1, 0.01 or 0.001 as appropriate. It is to be understood, even if it is not always explicitly stated, that all numerical designations are preceded by the term "about". It is also to be understood, even if it is not always explicitly stated, that the compounds and structures described herein are merely exemplary and that equivalents of such are known in the art and can be substituted for the compounds and structures explicitly stated herein.

Wherever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Wherever the term "no more than," "less than," or "less than or equal to" precedes the first numerical value in a series of two or more numerical values, the term "no more than," "less than" or "less than or equal to" applies to each of the numerical values in that series of numerical values. For example, less than or equal to 1, 2, or 3 is equivalent to less than or equal to 1, less than or equal to 2, or less than or equal to 3.

Filtration Media

The present disclosure pertains to an optimum, low maintenance, and low-cost filtration media (i.e., ZIPGEM) that may be implemented near a source water location as a pretreatment to remove tannic acid or humic acid (i.e., color)

from dissolved natural organic matter (hereinafter "NOM") (i.e., tannic acid, humic acid) to impede the prompt production of disinfection by-products collectively termed trihalomethanes and are abbreviated as either THM or TTHM (for total trihalomethanes) in drinking water treatment processes.

Figure 1B:
FIG. 1B is a photograph comprising a sample collection location of the Black Creek Tributary, according to an embodiment of the present disclosure.
Figure 1C:
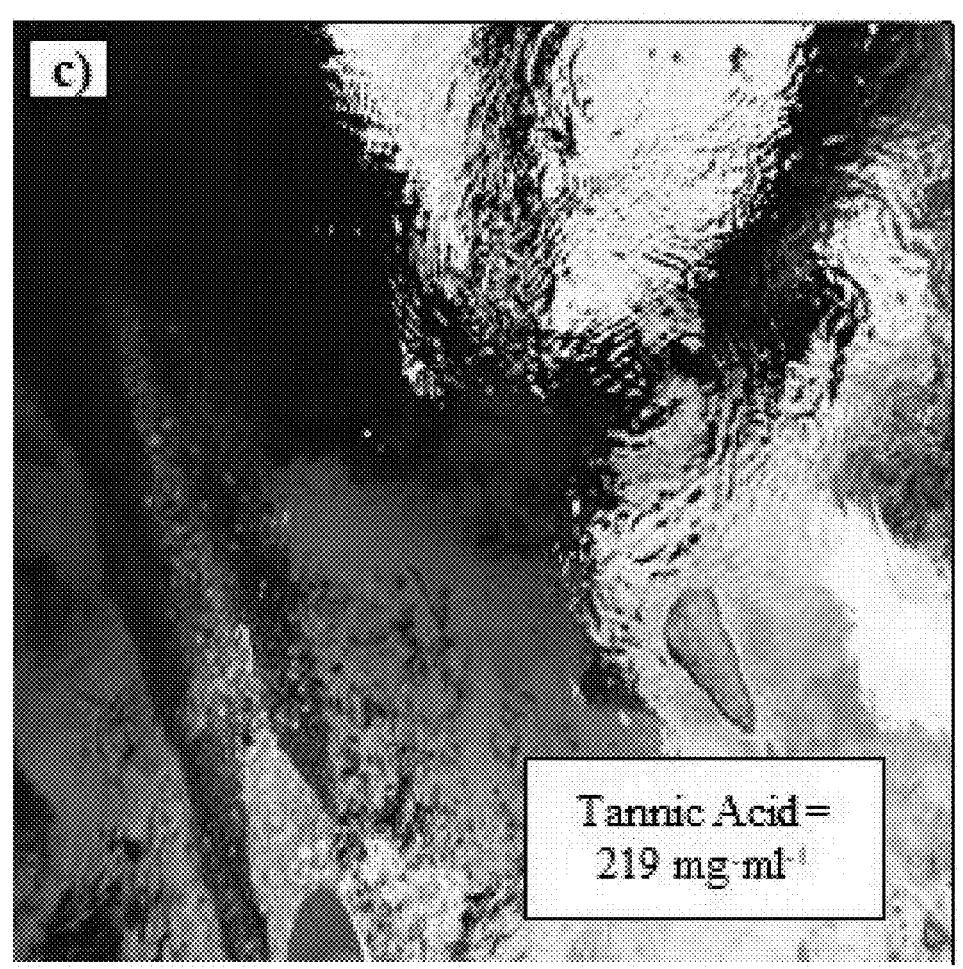
FIG. 1C is a photograph comprising the raw water in the location of collection of the Black Creek Tributary, according to an embodiment of the present disclosure.
Figure 1D:
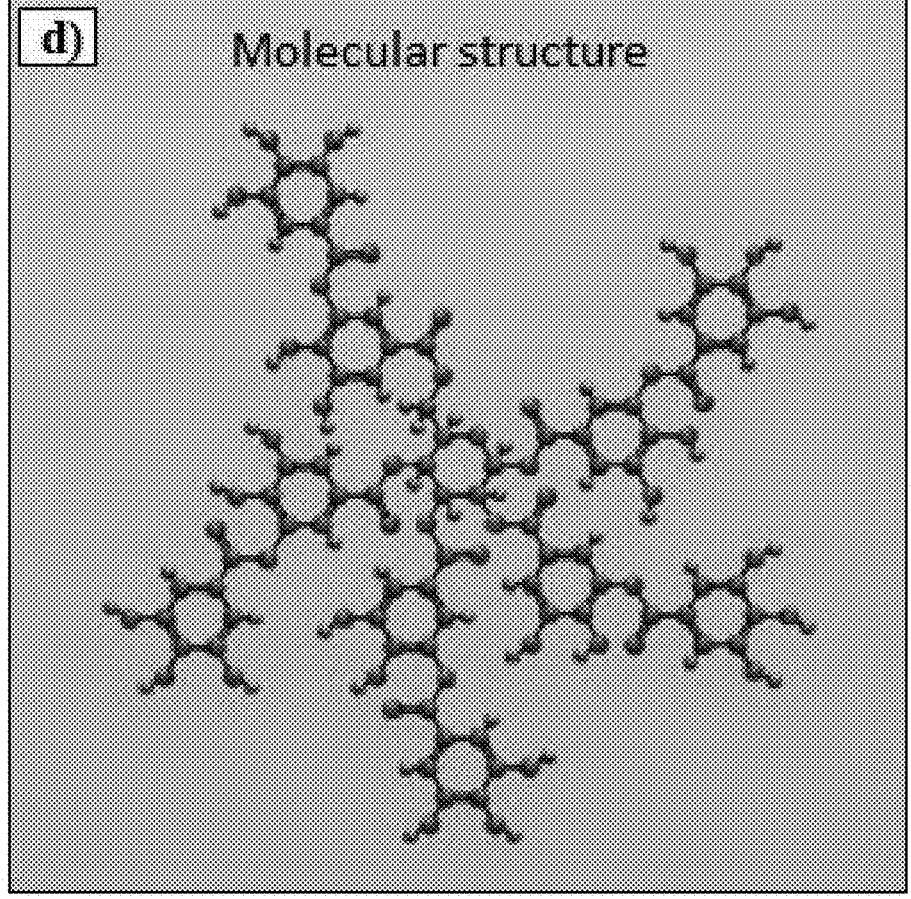
FIG. 1D is an image illustrating a chemical structure of tannic acid, according to an embodiment of the present disclosure.

FIGS. 1A-1D depict a water sample and a sample collection location of the water source, according to an embodiment of the present disclosure. As such, in an embodiment, the sorption media utilizes the synergistic effects of several components to remove the color from the water. In some embodiments, the components are made from recycled materials and/or may include but are not limited to clay, sand (e.g., quartz), perlite, and/or zero-valent-iron to create a cost-effective media for the removal of color (e.g., tannic acid and humic acid, as shown in FIG. 1D) from water sources. In some embodiments, the sorption media may include iron-filling green environmental media 4 (hereinafter "IFGEM-4"), clay-perlite and/or sand sorption media (hereinafter "CPS), and/or zero-valent iron and perlite-based green environmental media (hereinafter "ZIPGEM" and/or "filtration media"). As such, in an embodiment, the filtration media may comprise composition ratio having a range of at least 50% sand to at most 96% sand, at least 1% clay to at most 30% clay, at least 1% ZVI to at most 30% ZVI, and at least 1% perlite to at most 30% perlite by volume. For example, in some embodiments, the filtration media may comprise a composition ratio of 85% sand, 5% clay, 6% ZVI, and 4% perlite by volume. Additionally, as an alternative example, in some embodiments, the filtration media may comprise a composition ratio of 83% sand, 5% clay, 6% ZVI, and 6% perlite by volume.

The unit cost per color removal is about 10+ times lower than that of photocatalytic, coagulation, and/or microfiltration methods. As such, the filtration media may be used as soil amendment in forest land and/or in landfill as at least one daily cover material. In an embodiment, the filtration media may be configured to remove color by maintaining the effluent concentration below at least forty (40) color units of Pt—Co for at least 10,000 minutes (e.g., 14,080 minutes) given the quantity of at least 500 ml (e.g., 900 ml) media volume and/or the hydraulic loading rate of at least 30 gallon·day$^{-1}$·ft$^{-2}$ (e.g., 31.02 gallon·day$^{-1}$·ft$^{-2}$), which may be very competitive with respect to other existing options known in the art. Additionally, in this embodiment, the filtration media may not only be used to remove tannic acid and/or humic acid in natural water, but also filtration media may be applied to remove at least one dye in at least one of a plurality of industrial wastewater effluents, with a fairly broad application spectrum. The filtration media may also comprise one of the green sorption media, such that at least one recycled material may be used as at least one ingredient in the mix in a circular economy that meet the sustainable development goals of the United Nations.

Figure 2:
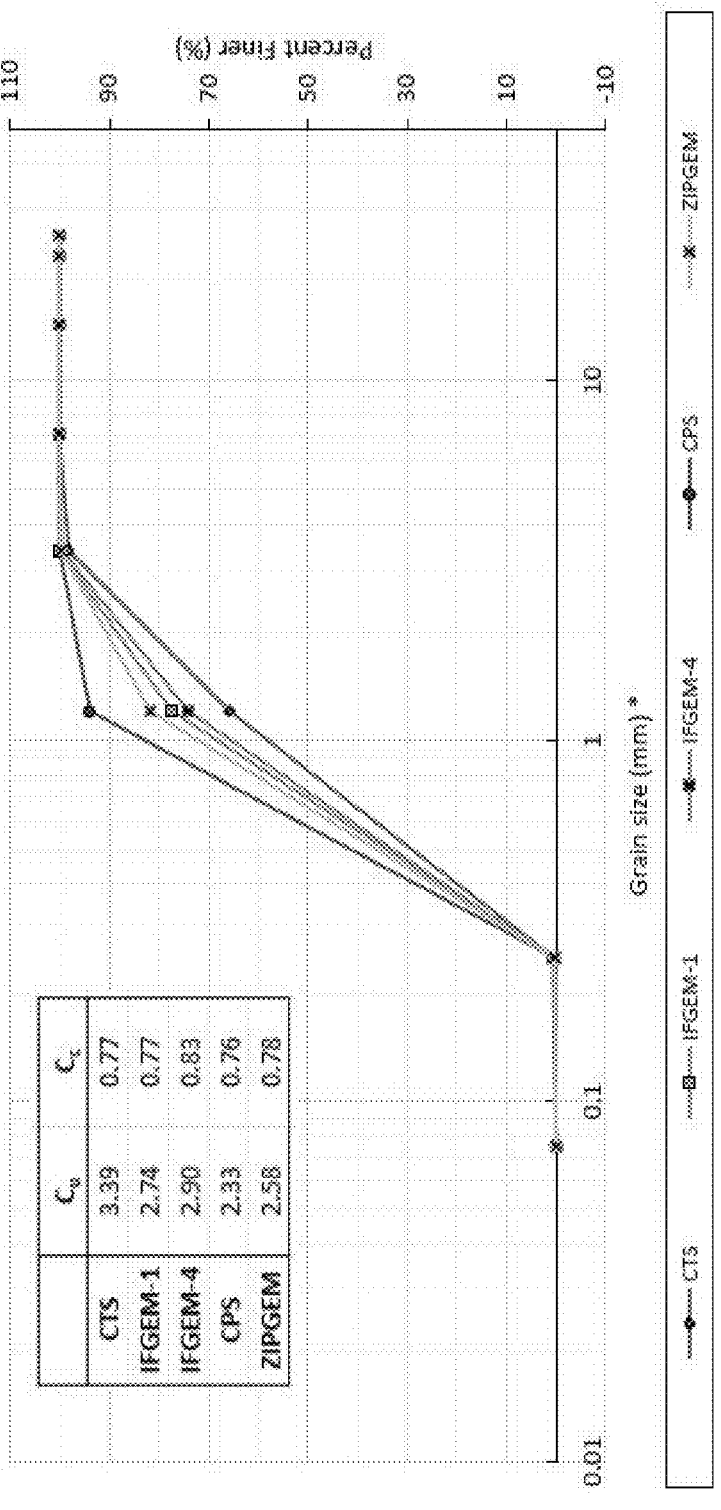
FIG. 2 is a plot illustrating gradation curves of a sorption (i.e., filtration) media (*x-axis is in logarithmic scale), according to an embodiment of the present disclosure.

The deficiencies of prior art such as lower than photocatalytic, coagulation, and/or microfiltration methods have at least 10 times a higher price, and/or photocatalytic, coagulation, and/or microfiltration methods require sophisticated control schemes with operational complexity. In contrast, as shown in FIG. 2, in an embodiment, there is almost no process control requirement in the filtration media-based filter cells. Accordingly, based on the $C_u$ and $C_c$ scores, as shown in FIG. 2, the quality of the filtration media-based filter cell may vary between a poor-grade and a high grade. In addition, the filtration media may have no sludge and/or concentrate as residuals for final disposal whereas coagulation, membrane, and/or microfiltration often suffer from sludge and/or concentrate disposal. Thus, no limitation may be observed in the filtration media applications.

The following list provides at least one possible usage of the filtration media for cost-effective and/or large-scale color removal that can be applied either for ex situ or in situ facilities. Possible applications may include, but are not limited to, springs protection facilities, stormwater utilities, wastewater treatment plants, water treatment plants, integrated water resources management facilities at the watershed scale, environmental remediation facilities for soil and water remediation, forest runoff, the mining industry (e.g., tailing water for treatment), the textile industry, the dyeing industry, the food industry, the beverage industry, the drug industry, and/or the paper mill industry.

Filtration Media Material Characterization

In an embodiment, the filtration media (i.e., ZIPGEM) may comprise a surface area having a range of at least 2.00 $m^2 \cdot g^{-1}$ to at most 3.00 $m^2 \cdot g^{-1}$. For example, in some embodiments the surface area of the filtration media may be 2.55 $m^2 \cdot g^{-1}$, which comprises the largest surface area as compared to the sorption media known in the art (e.g., CTS, IFGEM-1, IFGEM-4, and/or CPS). As such, as known in the art, larger surface area may lead to better adsorption potential. In terms of porosity, the filtration media may be at least 15%. For example, in some embodiments, the filtration media may have a porosity of 29.04%. Additionally, in an embodiment, the filtration media may comprise a saturated hydraulic conductivity within the typical range for sand (at least $10^{-3}$ to at most $10^{-5}$ $m \cdot sec^{-1}$), indicating that the filtration media may be appropriate for field implementation. Finally, in this embodiment, the inclusion of ZVI in the filtration media may be associated with the resultant higher density and/or larger surface area within the filtration media, such that the filtration media may optimize color removal facilitation. In this manner, in an embodiment, the filtration media may comprise a density having a range of at least 1.50 $g \cdot cm^{-3}$. As such, in some embodiments, for example, the filtration media may comprise a density of 2.80 $g \cdot cm^{-3}$. Furthermore, in an embodiment, the filtration media may have a chemical composition comprising at least one Al atom, at least one Si atom, at least one P atom, at least one K atom, at least one Ca atom, and/or at least one Fe atom.

In this manner, in an embodiment, the filtration media may comprise at least one Si atom (e.g., silica) within its chemical composition, such that the at least one Si atom comprises the main chemical element of the filtration media. As known in the art, amino-functionalized magnetic mesoporous silica may remove tannic acid from aqueous solution, via adsorption. Next, in this embodiment, the second most abundant chemical component within the chemical composition of the filtration media may be Al (i.e., aluminum). Accordingly, the presence of at least one Al atom within chemical composition of the filtration media may be explained by the inclusion of clay as at least one ingredient of the filtration media. As such, the at least one Al atom may be utilized for removal of diverse contaminants including but not limited to nutrients, metals, and/or contaminants of emerging concern. In addition, in this embodiment, the filtration media may also comprise at least one ZVI atom and/or at least one recycled ZVI (e.g., 95.6% Fe) atom within the chemical composition of the filtration media, such that a removal of contaminants may be substantially improved given the reactivity, large surface area, lower cost, and/or environmentally friendly nature of the at least one ZVI atom and/or the at least one recycled ZVI. Furthermore, in this embodiment, the filtration media may also comprise at least one K (i.e., potassium) atom and/or Ca (i.e., calcium) atom (e.g., 1-2.5% and/or 0.7-1%, respectively) within the filtration media's chemical composition, and thus, to some extent their presence may aid in a synergistic effect that can be helpful for the removal of contaminants.

Figure 3A:
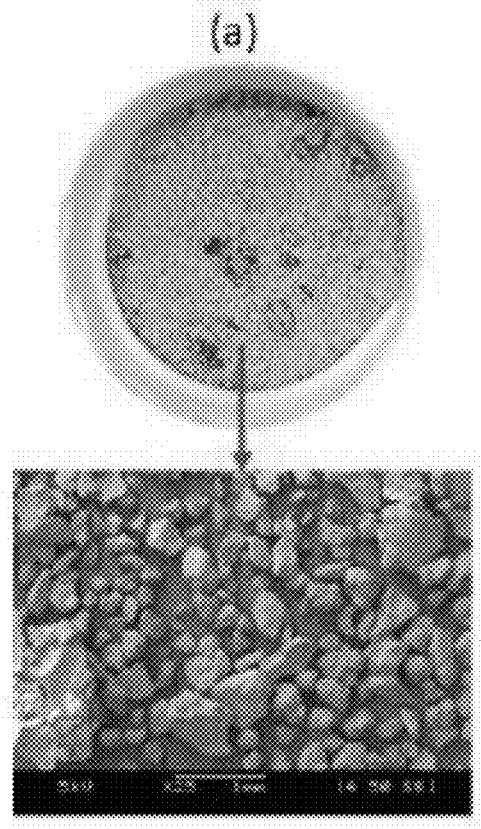
FIG. 3A is a photograph and SEM image of sorption media, CTS, according to an embodiment of the present disclosure.
Figure 3B:
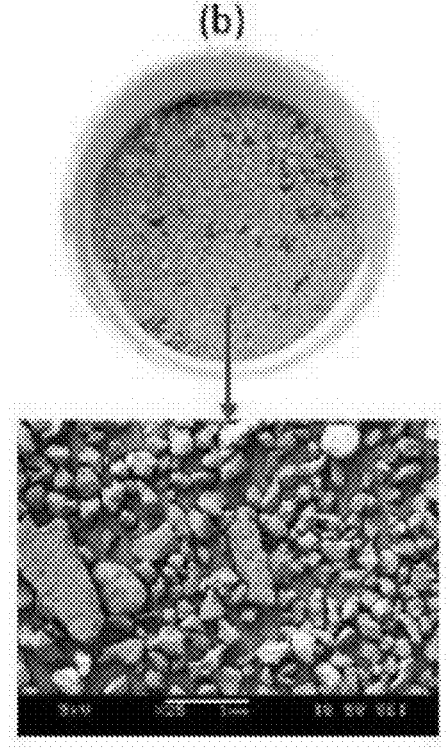
FIG. 3B is a photograph and SEM image of sorption media, IFGEM-1, according to an embodiment of the present disclosure.
Figure 3C:
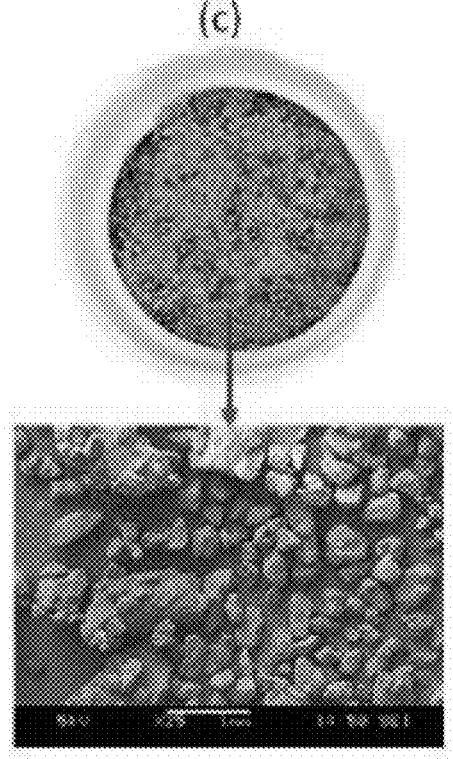
FIG. 3C is a photograph and SEM image of sorption media, IFGEM-4, according to an embodiment of the present disclosure.
Figure 3D:
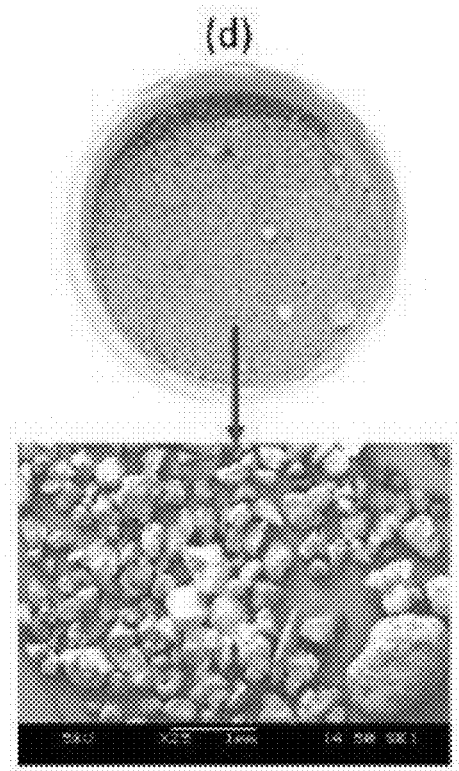
FIG. 3D is a photograph and SEM image of sorption media, CPS 367, according to an embodiment of the present disclosure.
Figure 3E:
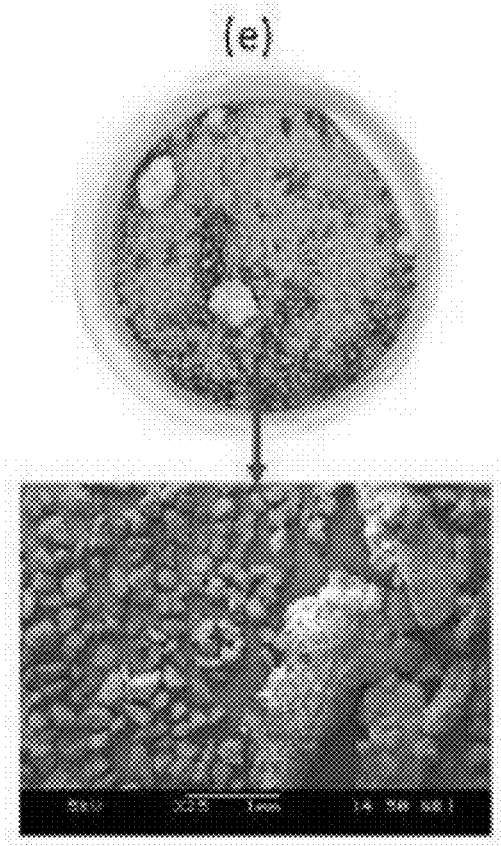
FIG. 3E is a photograph and SEM image of sorption media, ZIPGEM, according to an embodiment of the present disclosure.

FIGS. 3A-3D depict photographs and SEM images of sorption media, according to an embodiment of the present disclosure. As such, as shown in FIG. 3E, in conjunction with FIGS. 4A-4D, in an embodiment, the filtration media may comprise a heterogenous size and shape. As such, in some embodiments, the filtration media may comprise at least one Si—Al and/or at least one Fe—Si bond, such that the at least one ZVI atom may be disposed about the surface of the sand and/or perlite (e.g., Si) quartz structure, causing the at least one ZVI atom to interact with the at least one water sample. As compared to sorption media known in the art (e.g., CTS, IFGEM-1, IFGEM-4, and/or CPS), the filtration media may comprise the most heterogenous size and/or shape, such that the filtration media may provide at least one 3-dimensional morphological structure with a higher hydraulic conductivity at the microscale than the known sorption media in order to promote and/or enhance molecular diffusion in at least one multi-layer structure during an adsorption process. As known in the art, poorly graded materials with morphological structures may have a higher potential to allow dispersion and molecular diffusion to occur in layer-by-layer films during the adsorption process. Accordingly, in this embodiment, the filtration media may be formed by the following steps, including but not limited to: (1) a mass transfer in a liquid phase via convective mass transfer followed by molecular diffusion; (2) an interface diffusion via film diffusion between the liquid phase and the exterior surface of the adsorbent; (3) an intrapellet mass transfer through surface diffusion and pore diffusion; and/or (4) an adsorption-desorption reaction before and after equilibrium.

Filtration Media Color Removal Efficiency

Figure 5A:
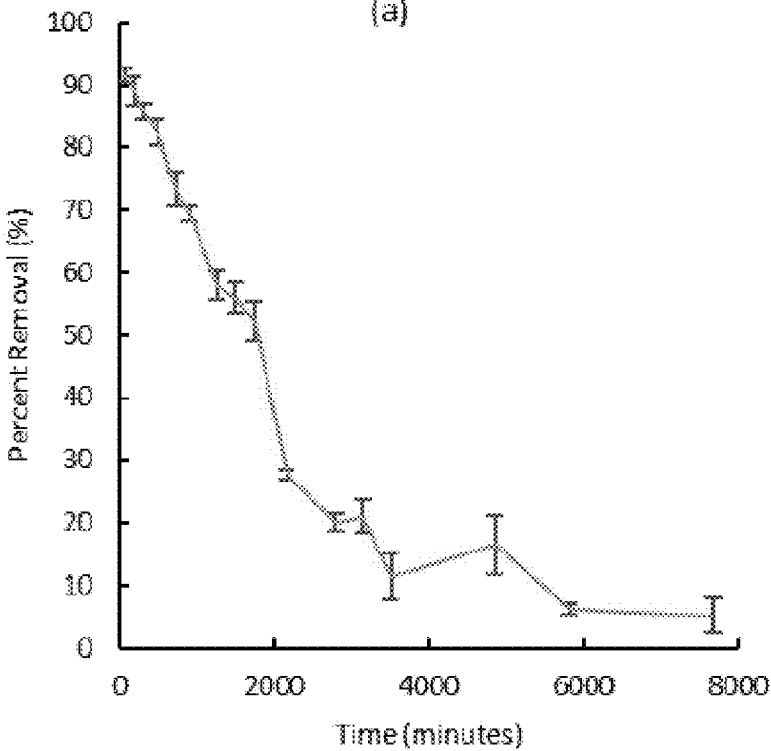
FIG. 5A is a plot illustrating a dynamic color removal efficiency curve for 438 of CTS, according to an embodiment of the present disclosure.
Figure 5B:
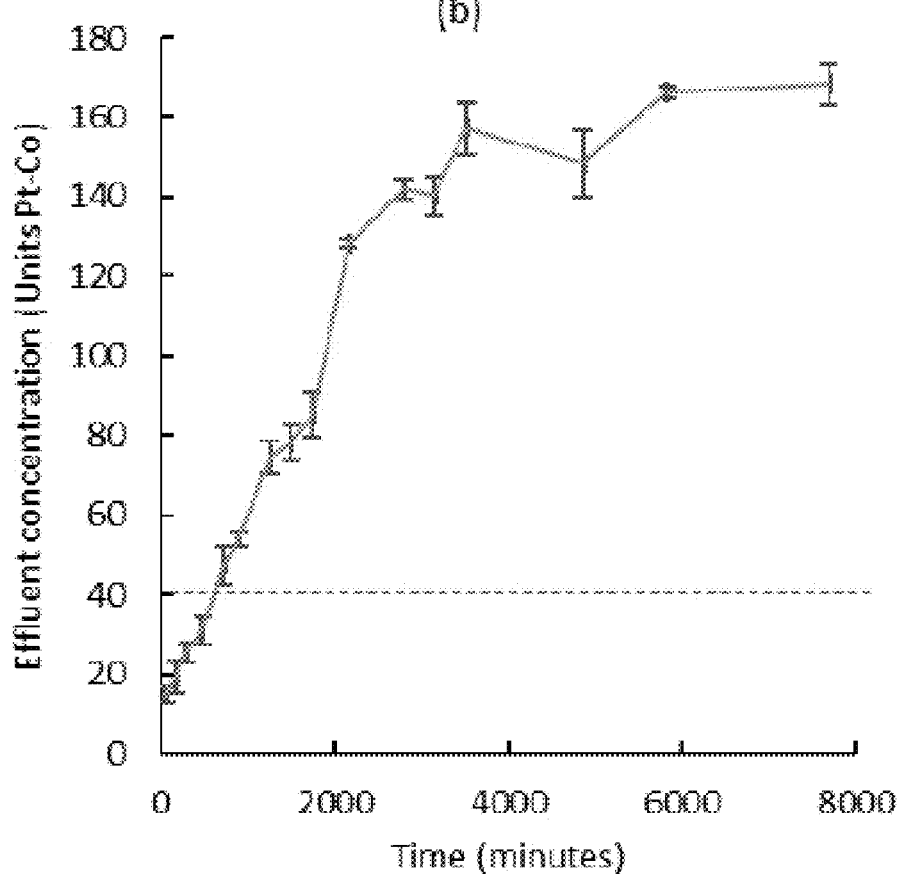
FIG. 5B is a plot illustrating a dynamic color removal breakthrough curve for 438 of CTS, according to an embodiment of the present disclosure.
Figure 5C:
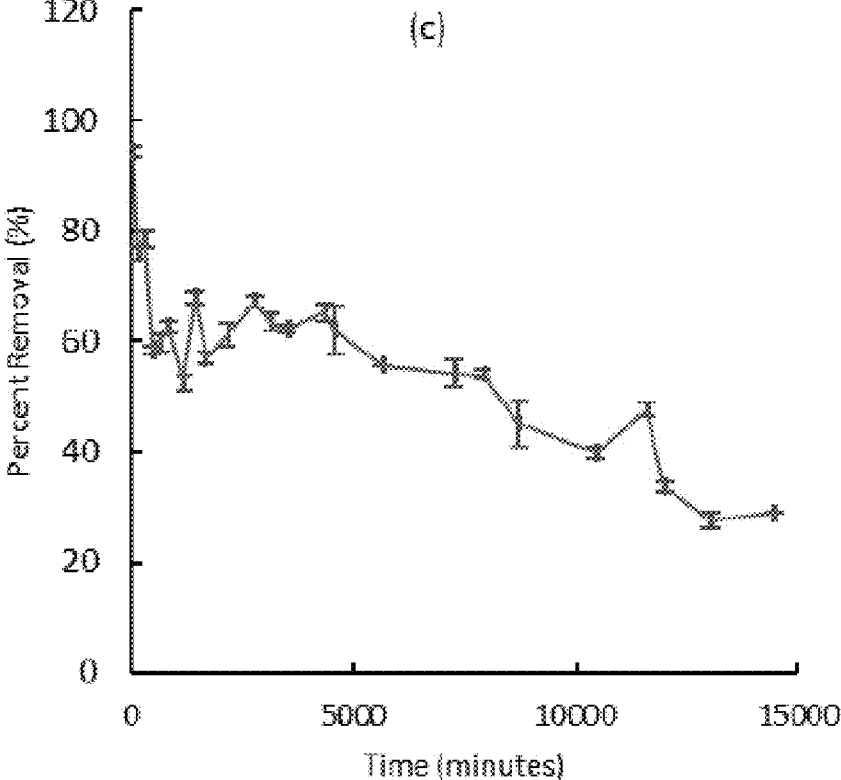
FIG. 5C is a plot illustrating a dynamic color removal efficiency curve for IFGEM-1, according to an embodiment of the present disclosure.
Figure 5D:
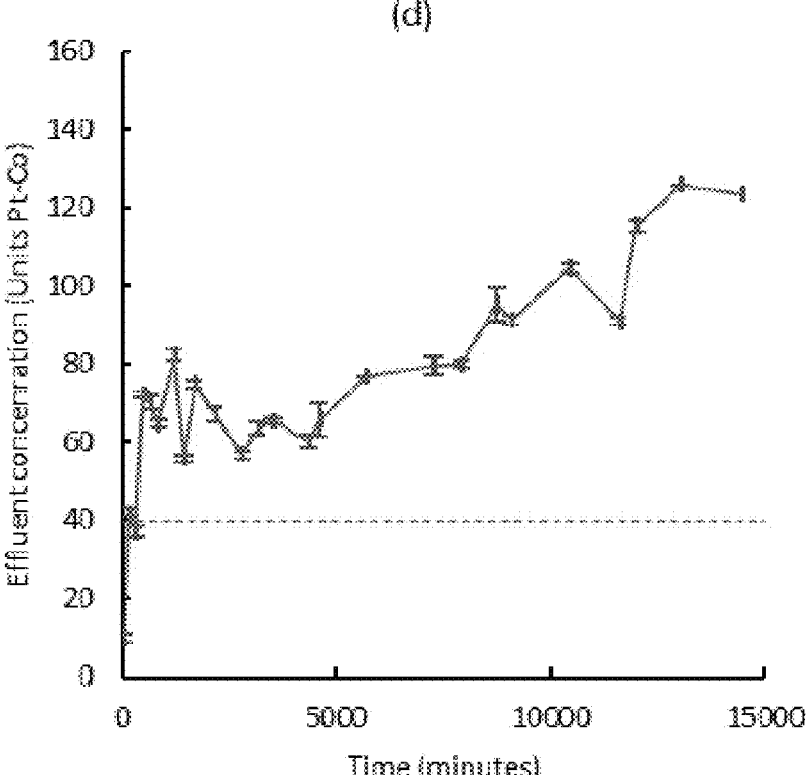
FIG. 5D is a plot illustrating a dynamic color removal breakthrough curve for IFGEM-1, according to an embodiment of the present disclosure.
Figure 5E:
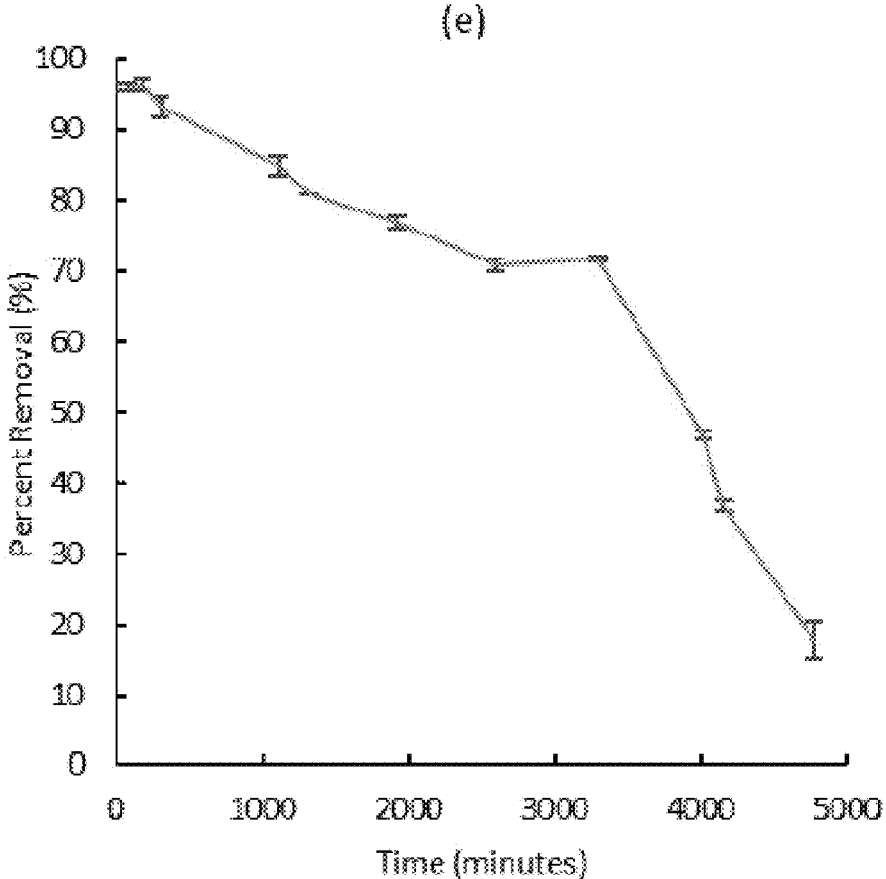
FIG. 5E is a plot illustrating a dynamic color removal efficiency curve for IFGEM-4, according to an embodiment of the present disclosure.
Figure 5F:
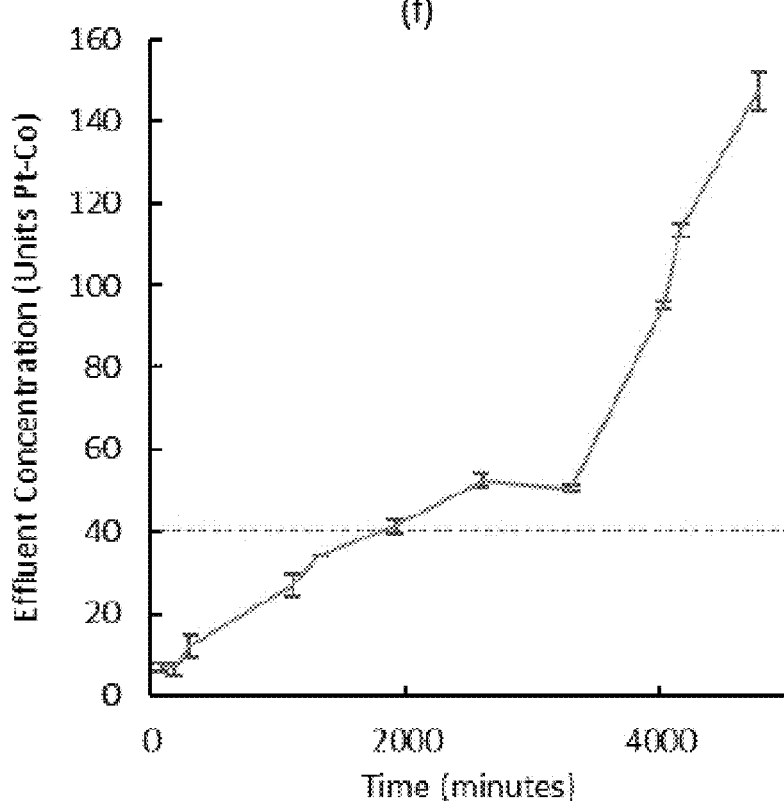
FIG. 5F is a plot illustrating a dynamic color removal breakthrough curve for IFGEM-4, according to an embodiment of the present disclosure.
Figure 5G:
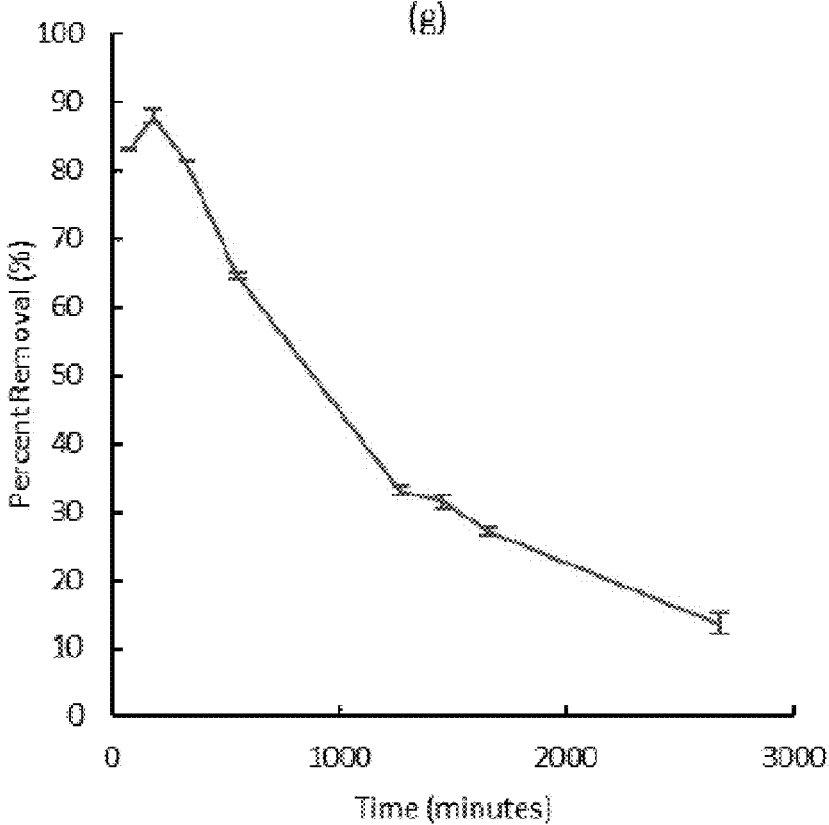
FIG. 5G is a plot illustrating a dynamic color removal efficiency curve for CPS, according to an embodiment of the present disclosure.
Figure 5H:
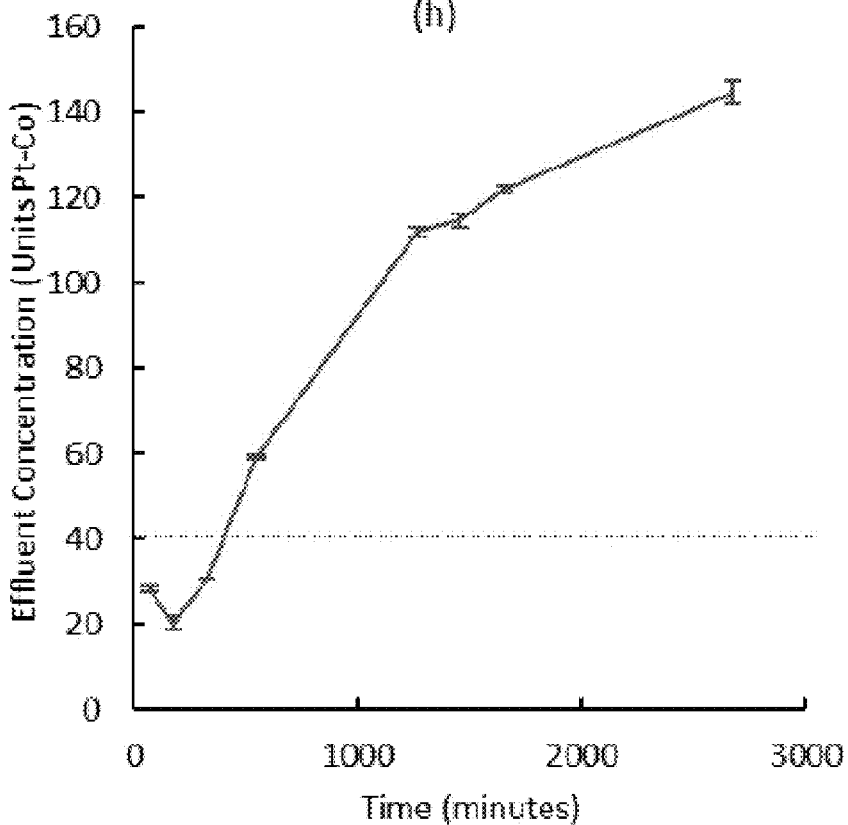
FIG. 5H is a plot illustrating a dynamic color removal breakthrough curve for CPS, according to an embodiment of the present disclosure.
Figure 51:
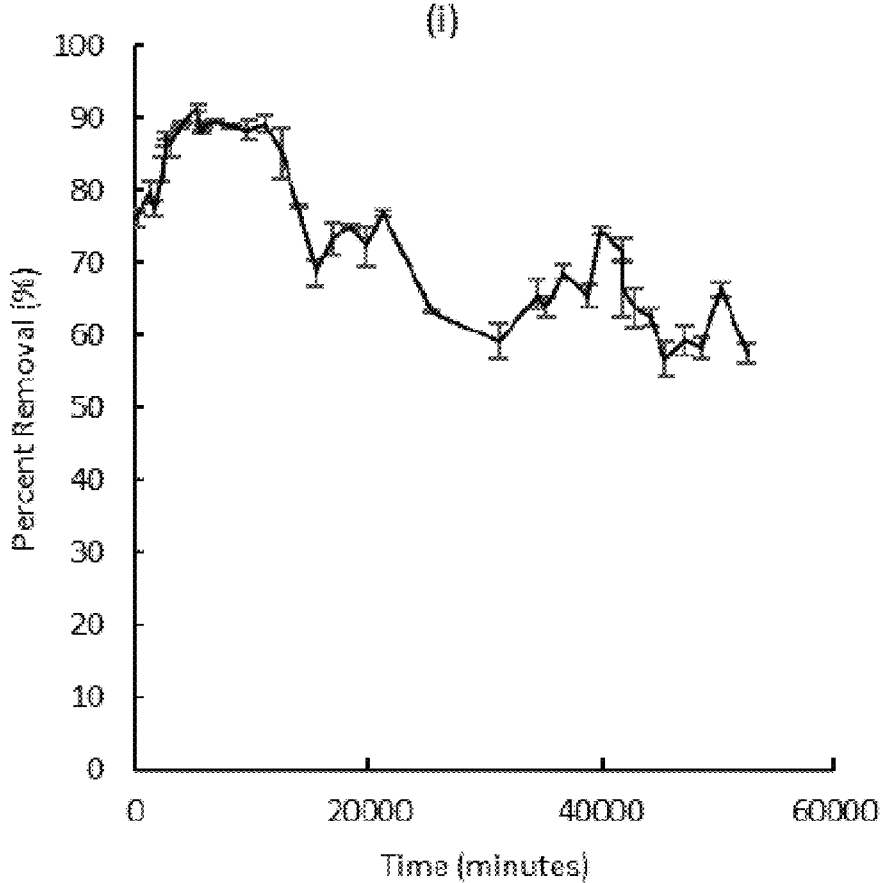
Figure 5J:
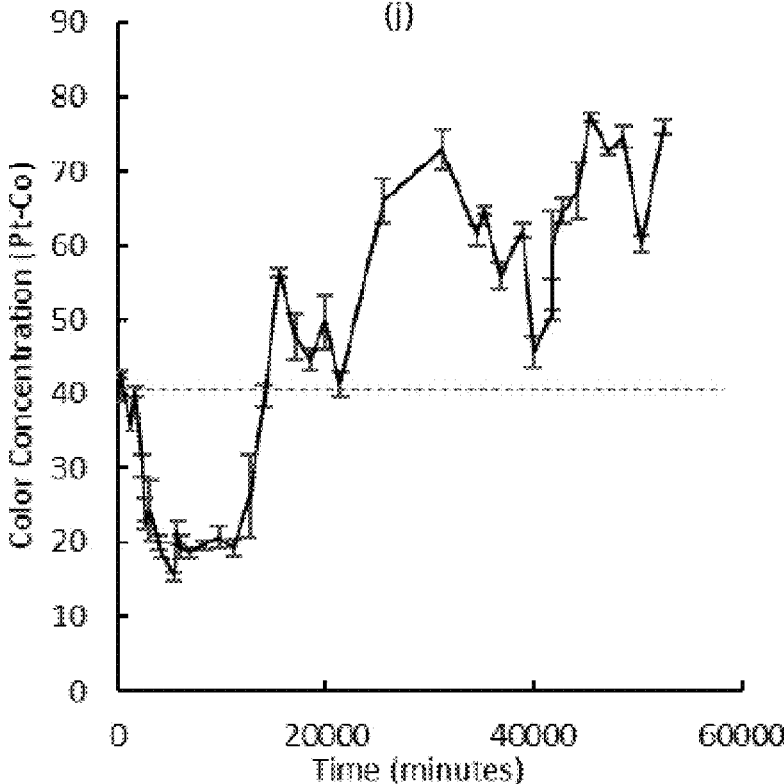
FIG. 5J is a plot illustrating a dynamic color removal breakthrough curve for 439 ZIPGEM, according to an embodiment of the present disclosure.

FIGS. 5A-5J depict plots illustrating dynamic color removal efficiency curves and dynamic color removal breakthrough curves, according to an embodiment of the present disclosure. The results are presented in FIGS. 5A-5J in terms of time (minutes) vs. color removal efficiency (%). In this manner, as shown in FIG. 5I and FIG. 5J, in an embodiment, the filtration media (i.e., ZIPGEM), comprising a mix of ZVI, perlite, clay, and/or sand, may comprise the highest efficiency among all sorption media known in the art (e.g., CTS, IFGEM-1, IFGEM-4, and/or CPS), as effluent concentrations below 40-unit Pt—Co were observed for prolonged times. Additionally, in this embodiment, the filtration media may comprise a possible recovery of the adsorption capacity (e.g., at least 70% filtration of color) for at least 40,000 minutes. As such, in this embodiment, the filtration media may also not comprise a ponding and/or clogging issue during the life cycle of the filtration media until at least 60,000 minutes.

In this manner, as known in the art, the clogging and/or ponding may be associated with the ZVI particles undergoing oxidization resulting in iron oxide clogging the pore space in the media mix and affecting the infiltration negatively. Given that some Al and Fe can be dissolved in water the major tannic acid removal mechanism could be chemical precipitation driven by the formation of solid organometallic complexes, the emergence of Al-tannate can also contribute to clogging issues. The higher the content of ZVI, the larger the chance to have a ponding effect due to accumulation of aluminum and iron salts on the surface of Si (found in sand). As such, in an embodiment, the filtration media may comprise a ZVI and Sand ratio of at most 0.090 (ZVI/Sand percent by volume). In some embodiments, for example, the ZVI and Sand ratio may be at least 0.071 (ZVI/Sand percent by volume). Additionally, in an embodiment, since the filtration media comprises a larger surface area and/or hydraulic conductivity, high porosity, and/or a high-grade heterogenous morphological structure as compared to the sorption media known in the art (e.g., CTS, IFGEM-1, IFGEM-4, and/or CPS), in addition to comprising stronger ionic interactions, van der Walls forces, and/or hydrogen bonding effects as compared to the sorption media known in the art, the removal of color from a water sample may be optimized.

Filtration Media Removal Mechanism

As known in the art, tannic acid tends to spontaneously adsorb to different surfaces to yield a hydrophilic coating. In this manner, it has been suggested the interactions between soil minerals and tannins result in adsorption. It was discovered that the adsorption mechanism is heterogeneous, and dependent on pH and ionic strength. Moreover, prior studies have indicated that the adsorption of tannic acid to silicate is completed after about 15 minutes revealing that it produces a thin layer on $SiO_2$. The removal of tannic acids with clay is also related to adsorption. However, as noted in the prior art, attapulgite clay coated with chitosan was found to adsorb 95.3 mg $g^{-1}$ of tannic acid driven by electrostatic interactions, hydrogen bonding, and Van der Waals forces. In addition, since the anionic functional groups of tannic acid include hydroxyl and carboxyl groups, it has been noted that it can adsorb on oxide surfaces. Furthermore, as stated in the prior art, tannic acid is negatively charged, hence $Ca^{2+}$ can aid to bind negatively charged surfaces such as species of tannic acid.

Besides, as known in the art, an Al ion has the possibility of interacting with multiple tannic acid molecules and the formation of insoluble complexes resulting from aluminum compounds such as Al—OH at low and/or high pH. While at pH between 5-6, when $Al(OH)_3$ is the predominant form, complex formation is replaced by adsorption onto $Al(OH)_3$ surface. As such, the coprecipitation of tannic acid with $Al(OH)_3$ occurs in the presence of hydrous aluminum oxide (e.g., $Al(OH)_3$) leading to soluble colloidal hydroxy-Al-tannate complexes. In the case of humic substances, prior studies have noted that when Al-humic complexes are formed, charge neutralization occurs. Similarly, since tannic acid is a polymeric molecule, it can chelate with $Fe^{3+}$ ions, producing an insoluble complex where the structure is contingent on the solution.

As known in the art, given the composition of NOM present in natural water, the color removal mechanism encompasses the process of precipitation, charge neutralization, entrapment, adsorption, and complexation with coagulant metal ions into insoluble particles. The reduction in tannic acid in water can also be attained by precipitation leading to the formation of solid complexes which can be separated in processes like coagulation and sedimentation. As known in the art, the effect of tannic acid on phosphate and organism matter removal during wastewater treatment. Inorganic salts of aluminum or iron are primary coagulants in natural or engineered systems that can hydrolyze to generate insoluble precipitates and entrap particles, neutralizing the charge on the particles. As mentioned in prior studies, accumulation of positively charged aluminum and iron salts (i.e., coagulating metal ions) on the surface of Si given the suitable pH values in water, could also attract negatively charged particles. In this manner, the NOM removal with ferric salts has been reported in a range for 29-70%, and NOM may also react with polyvalent metal cations producing soluble metal-NOM complexes.

Figure 6:
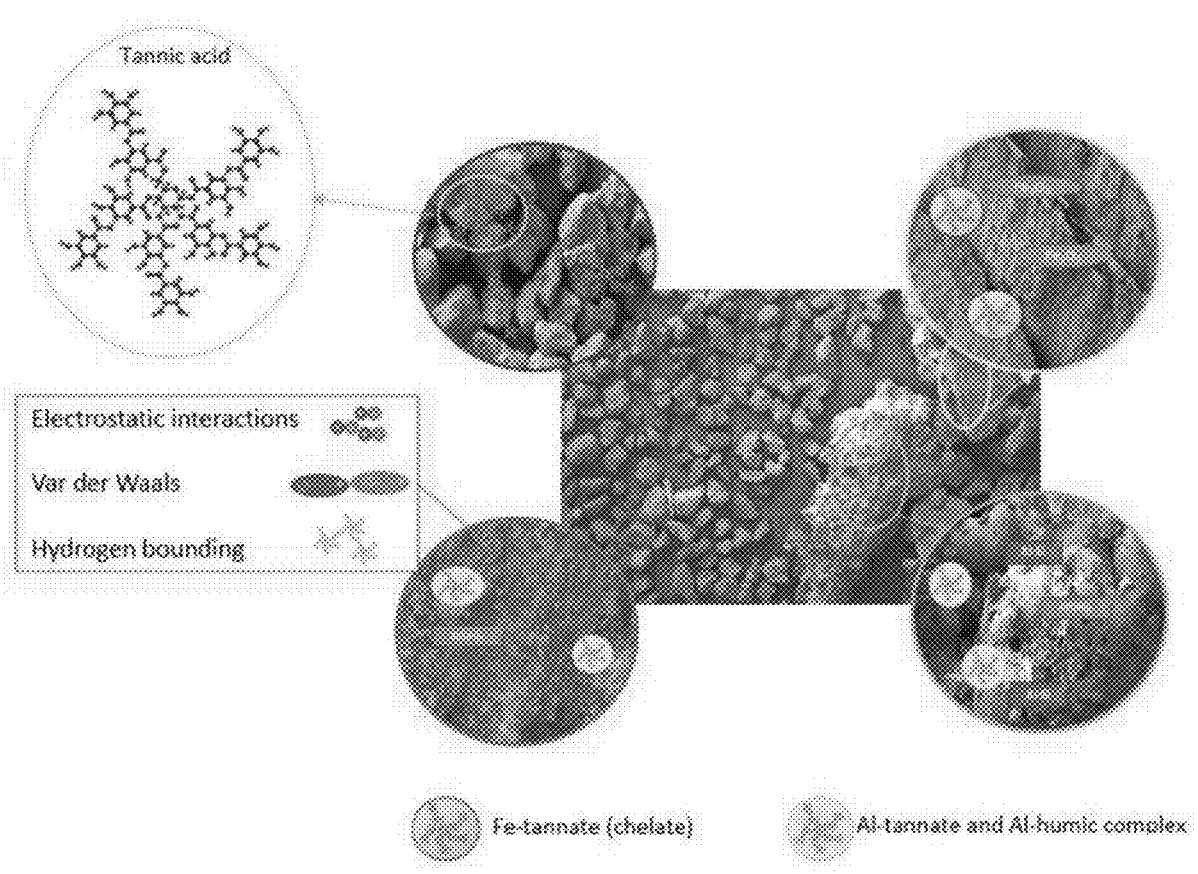
FIG. 6 is a graphical workflow illustrating a removal mechanism in ZIPGEM, according to an embodiment of the present disclosure.

FIG. 6 depicts a graphical summary illustrating a removal mechanism in ZIPGEM, according to an embodiment of the present disclosure. As such, in an embodiment, interactions among at least one component and at least one alternative component within the filtration media may occur throughout the color removal process. In this manner, in this embodiment, the interactions among the at least one compound (e.g., perlite, clay, sand, and ZVI) and at least one alternative compound (e.g., perlite, clay, sand, and ZVI) of the filtration media may thus promote efficient color removal. As shown in FIG. 6, sand and perlite may be configured to work together via the retention of the precipitates (Al-tannin and Fe-tannin complexes) in the porous space while aiding in adsorption. It should be noted that sand, clay, and/or perlite may share removal mechanisms pertaining to Al and/or Al—Si bonds given their chemical composition. As shown in FIG. 3E, in this embodiment, the unique morphology of the filtration media may help the diffusion and/or dispersion of the filtration media, such that the color removal efficiency may be optimized.

Adsorption is still one of the most cost-effective treatment methods for the removal of color for drinking water treatment. Given the influent condition of 175±10 Pt—Co units, the adsorption capacity can be ranked in terms of how long the proposed media sustained the color removal of greater than or equal to 77%. As such, in an embodiment, the filtration media is configured to optimize the color removal efficiency during drinking water treatment. In this manner, in this embodiment, the filtration media may be configured to maintain the effluent below 40 Pt—Co units for at least 14,000 minutes, such that the filtration media may comprise a composition mix of at least 1000 ml by volume (e.g., 1200 ml by volume) and/or the prescribed adsorption capacity. As such, the performance of the filtration media may be attributed to the inclusion of at least one the following, including but not limited to perlite and/or ZVI and/or synergetic effects between clay and sand. Moreover, as compared to the sorption media known in the art (e.g., CTS, IFGEM-1, IFGEM-4, and/or CPS), the adsorption capacity of the filtration media (e.g., at least 25.0 mg of Pt—Co·$g^{-1}$) may be superior to the adsorption capacity of the rest the sorption media known in the art. Moreover, observed morphology of ZIPGEM shown by SEM indicated a heterogenous surface further supporting the longer duration of color removal observed. Additionally, in this embodiment, the filtration media may comprise at least one synergistic interactions among at least two compounds with unique morphological structure within the composition mix of the filtration media, such that the filtration media may be configured to promote color removal by improving physicochemical interactions via better dispersion and/or diffusion, optimizing color removal efficiency within drinking water treatment.

The following examples are provided for the purpose of exemplification and are not intended to be limiting.

EXAMPLES

Example 1

Experimental Comparison of ZIPGEM (i.e., Filtration Media) and Sorption Media Known in the Art (e.g., CTS, IFGEM-1, IFGEM-4, and CPS)

Within the five tested sorption media, a media recipe of Zero-valent-Iron and Perlite Based Green Sorption Media (hereinafter "filtration media" and/or "ZIPGEM) comprising a composition ratio of 85% sand, 5% clay, 6% zero-valent-iron (ZVI) and 4% perlite by volume stood out as the best option for color removal. Findings showed that ZIPGEM (i.e., filtration media) can maintain a color removal of ~77% for about 14,080 minutes, maintaining the effluent concentration below 40 Pt—Co units given the influent condition of 175±10 Pt—Co units. A recovery on the adsorption capacity of ZIPGEM was observed around 40,000 minutes due to synergetic effects among several different components of recycled ZVI, clay, sand, and perlites. ZIPGEM can be applied to industrial wastewater treatment for dye removal as well.

Five sorption media, including Clay-Tire crumb and Sand sorption media (denoted CTS, hereafter), Iron-Filing Green Environmental media 1 and 4 (denoted IFGEM-1 and IFGEM-4, hereafter, respectively), Clay-Perlite and Sand sorption media (denoted CPS, hereafter) and Zero-valent Iron and Perlite Green Environmental Media (denoted as ZIPGEM), were tested to evaluate their effectiveness to remove color from a source water collected from a water canal polluted with tannic acid.

The tannic acid in this canal is high given the abundant in cypress forests within the water sample area. Among these sorption media, CTS and IFGEM-1 were previously studied for nutrient and metal removal (Chang et al., 2019a; Chang et al., 2019b; Valencia et al., 2019; Wen et al., 2018; Chang et al., 2020). IFGEM-4, CPS and ZIPGEM were developed, due to the potential contribution of coupled perlite and zero-valent iron (hereinafter "ZVI") on the top of traditional sand and clay to the removal of color. The research objective and novelty associated with exploring and comparing the effectiveness of five sorption media (made from recycled materials) which are cheaper than activated carbon to treat water with high concentration of color and to examine whether they can meet the regulatory requirement (i.e., 40 Pt—Co color unit) in the St. Johns River Water Management District for source water pretreatment (SJRWMD, 2021). The questions to be answered were: (1) Is there any incremental effect on color removal from the sequential use of recycled iron filings and perlite?(2) What is the removal mechanism of color the proposed sorption media composition comprising components of recycled iron filings, clay, and perlite?(3) Which media mix of the five used can achieve the best color removal efficiency?

Material and Methods

Lake Brooklyn near Keystone Heights in Clay County, Florida, the United States (US) is facing a problem with low water level which is affecting recreational use and nearby shallow aquifer drinking water wells. Some wells have gone dry due to aquifer overuse, and hence the Lake Brooklyn is in acute need of replenishment. A state project to pump water from the Black Creek South Prong, a tributary of the St. Johns River, to Lake Brooklyn to recharge the semi-confined Upper Floridian aquifer at Keystone Heights has moved forward with the recent land acquisition needed for the about 27-km pipeline through southwest Clay County. The Floridan aquifer is one of the main sources of groundwater in the US and it is mainly composed of limestone and dolomite beds. The Floridan aquifer has confined, unconfined, and semiconfined areas, where the areas in the St. Johns River Management District are mostly semiconfined (Kat B. G., 1992). This is the first attempt in Northeast Florida for a project of this magnitude and will take up to 37,000 metric tons per day (e.g., 10 million gallons per day) from Black Creek, as shown in FIGS. 1A-1B. However, the interbasin water transfer project is hampered by the excessive concentration of color in Black Creek. Brown reddish color in this creek is the product of the high amount of tannic acid reaching the water body from cypress trees surrounding this area, as shown in FIGS. 1C-1D.

Before water can be transferred to the Upper Floridan aquifer, the water from Black Creek needs to be treated for color removal in situ. Current concentrations in this region range from 170 to 325 Pt—Co color units. However, the St. John River Management District standard for drinking source water is less than 40 color units Pt—Co (SJRWMD, 2021) before the interbasin transfer is allowed. Given the low cost associated with adsorption processes, and low maintenance requirements for filtration facilities, column studies to compare the application of sorption media were conducted to find the most appropriate design. Water collected from Black Creek was used as the influent for the column studies and was collected in $18.9 \times 10^{-3}$ m$^3$ plastic buckets and stored at the University of Central Florida (UCF) in a walk-in refrigerator set at a temperature of $-17.8°$ C.

Composition and Characterization of the Sorption Media

The five sorption media compositions were tested systematically for their potential to remove color from Black Creek water. The composition and matrix of the sorption media studied are summarized in TABLE 1. To further explore the effect on zero valent iron (ZVI) (e.g., iron filings) as component of the media, new iron-sand based sorption media mixes, known as IFGEM-1 and IFGEM-4, were developed. Furthermore, the utilization of perlite for the removal of contaminant (i.e., metals, dyes, and nutrients) is a novel development (Alakan and Dogan, 2001; Hosseini and Toghroli, 2021; Moussavi and Bagheri, 2012). It has been suggested in the prior studies that perlite has considerable potential to remove methyl violet dye from aquatic solutions, and its efficiency improves with increasing temperature and pH. (Dogan and Alkan, 2003) Such studies substantiate the inclusion of perlite in two newly developed sorption media denoted as Clay-Perlite and Sand media (denoted as CPS, hereafter) and Zero-valent Iron and Perlite Green Environmental Media (denoted as "ZIPGEM", hereafter (i.e., the filtration media)). The media compositions followed previous ones. (Valencia et al., 2021). Presently, as shown in TABLE 1, the CTS media mix was used as control to compare against iron-based media mixes, including IFGEM-1 and IFGEM-4, as well as perlite-based media mixes, including CPS and ZIPGEM.

TABLE 1

| Media name | Media Matrix (% by volume) |
| --- | --- |
| CTS | 85% sand, 5% clay, 10% tire crumb |
| IFGEM-1 | 96.2% sand and 3.8% ZVI |
| IFGEM-4 | 90% sand and 10% ZVI |
| CPS | 92% sand, 5% clay and 3% perlite |
| ZIPGEM | 85% sand, 5% clay, 6% ZVI and 4% perlite |

These five sorption media were characterized by hydraulic conductivity (m·sec$^{-1}$), BET surface area (m$^2$·g$^{-1}$), porosity (%), bulk density (g·cm$^{-3}$), and chemical composition (% per element). Media samples were delivered to the laboratories of EMSL Analytical, Inc. in Orange City, Florida for the measurement of grain size distribution, bulk density and BET surface area. The methods ASTM D422, ASTM D854 and ASTM B922 for particle size analysis for soils, specific gravity of soils and standard test methods for metal powder specific surface area by physical adsorption, respectively, were followed.

The hydraulic conductivity (or intrinsic permeability) was determined in a standard permeameter following the protocol for Constant Head Permeability test in the Geotechnical Laboratory at UCF. The porosity and the hydraulic retention time (HRT) of the sorption media were measured at UCF. The porosity was determined by measuring the volume of water needed to fill the pores of a dry media sample. The HRT was determined via a tracer examination with Rhodamine dye (CAS Number 37299-86-8). Rhodamine dye was selected due to low cost, easy operation and detection via a fluorometer, low natural background, limited toxicity level, and nonreactivity (Richard et al., 2004). For the tracer examination, about 1 ml of Rhodamine dye was injected at the top of the column, subsequently effluent samples were collected at 5-10 min intervals and measured by an Aquaflour™ (Turner Designs 998-0851) handheld fluorometer until the rhodamine dye breakthrough was observed and completed.

The chemical compositions of the different media were analyzed via an X-Ray Fluorescence Spectrophotometer (XRF) PANalytical Epsilion at the Materials Characterization Facility (MCF) at UCF (Dewi et al., 2018). Textural characterization of the media was obtained at the MCF at UCF with a Scanning Electron Microscopy (SEM) Jeol JSM-6480 SEM instrument. The Jeol SEM allows a variable pressure mode of operation allowing microscopy of nonconductive, oily, and damp samples.

As shown in FIG. 2, the results of the sieve analyses were plotted to obtain the grain size distribution curves or gradation curves from each sorption media mix. These results were used to evaluate whether these sorption media were poorly or well graded. To do so, the coefficient of uniformity (hereinafter "$C_u$") and the coefficient of gradation ("$C_c$"), which are the common measures of soil gradation, were calculated based on Equation (1) (hereinafter "Eq.") and Eq. (2) for these media mixes. Within this context, $D_{60}$, $D_{30}$ and $D_{10}$ is the grain diameter at 60%, 30% and 10% finer, respectively. The higher the $C_u$ value the higher the range of particle size. If the $C_u$ is greater than 4 and less than 6 then the media mix is classified as well graded, but, if the $C_u$ is less than 4 then the media mix is classified as poorly graded. However, for a media mix to be well graded, the $C_c$ value must range between 1 and 3.

$$C_u = \frac{D_{60}}{D_{10}} \qquad \text{Eq. (1)}$$

$$C_c = \frac{D_{30}^2}{D_{60}D_{10}} \qquad \text{Eq. (2)}$$

Experimental Set-Up for Column Exam:

A series of experiments with fixed bed columns was performed for the purpose of exploring the color removal efficiency and life expectancy of these selected sorption media. Columns 30.48 cm (12 in) in depth and 7.62 cm (3 in) diameter were filled with 1200 ml of the selected sorption media (i.e., CTS, IFGEM-1, CPS, IFGEM-4 and ZIPGEM) and a 5.08 cm (2-in) free space was left above the media in case of overflow. Each column set-up included a filter and a layer of pebbles at the bottom to prevent clogging, while a layer of pebbles was placed at the top of each column to aid in water distribution.

All column experiments were operated with a downward flow, simulating the planned implementation at field scale. Before the experiment, each column was flushed with deionized water (DI) at a flowrate of 8 ml·min⁻¹ for approximately 3 bed volumes and left to drain for >10 hours to remove any pre-existing contaminants in the sorption media. Subsequently, water collected from the Black Creek tributary of the St. Johns River (denoted as influent, hereafter) was supplied to each column via a peristaltic pump at a fixed flowrate of 4 ml . . . . The color concentration of the influent was modified to 175±10 Pt—Co units by adding DI water if necessary to maintain the same influent color concentration for all the column experiments. T for the column studies the hydraulic loading rate maintained was 1.26 (m³·day⁻¹·m⁻²).

Water Parameter Analysis

Water samples from the influent and effluent at distinct time intervals were collected, analyzed, and catalogued to obtain information on color removal. All water samples were analyzed for color within 24 hours of collection to prevent any biological and chemical processes from altering color concentrations. All water sample analysis were performed at the Environmental Engineering Laboratories at UCF. true color of each water sample was measured using a Hach Method 8025 spectrophotometer. First, water samples were filtered through a Millipore Sigma MF-Millipore Cellulose Ester membrane with 0.45-μm pore size. Subsequently, 10 ml of filter samples were used to fill a 465 nm cell and placed in the DR-5000 Hach Spectrophotometer meter to measure and catalogue true color concentrations.

Dynamic Adsorption Models

Dynamic modeling of the breakthrough curves allows the understanding of the sorption behavior of color to the sorption media. Thomas, Modified Dose Response (hereinafter "MDR"), and Yoon-Nelson models were selected to characterize the dynamic sorption mechanism. The Thomas model is derived from the Langmuir adsorption isotherm to describe the equilibrium between adsorbate and adsorbent where diffusion is neglected (Ghasemi et al., 2011; Mustafa and Ebrahim, 2010). The MDR model is an empirical model, appropriate for applications in breakthrough curves that have an asymmetric behavior (Chang et al., 2016). The Yoon-Nelson model is the simplest dynamic adsorption model as it does not require information on the adsorbent, adsorbate, or the physical characteristics of the sorption bed (Ghribi and Chlendi, 2011). The linear forms of these dynamic adsorption models with the definitions of parameters are shown in TABLE 2.

TABLE 2

| Model name | Linear Form | Parameters |
|---|---|---|
| Thomas | $\ln\left[\left(\frac{C_O}{C_t}\right) - 1\right] = \frac{k_T q_o m}{Q} - k_T C_0 t$ | $k_T$ = Thomas rate constant (L · mg of Pt-Co⁻¹ · min⁻¹) $q_o$ = media equilibrium uptake (mg of Pt-Co·g⁻¹) |

TABLE 2-continued

| Model name | Linear Form | Parameters |
|---|---|---|
| | | m = mass of media in the column (g) Q = flow rate (L · min$^{-1}$) |
| MDR | $\ln\left(\dfrac{C_t}{C_0 - C_t}\right) = a_{mdr}\ln(C_0 Qt) - a_{mdr}\ln(q_o m)$ | $a_{mdr}$ = MDR rate constant $q_o$ = media equilibrium uptake (mg · g$^{-1}$) Q = flow rate (L · min$^{-1}$) m = mass of media in the column (g) |
| Yoon-Nelson | $\ln\left(\dfrac{C_t}{C_0 - C_t}\right) = k_{YN}t - \tau k_{YN}$ | $\tau$ = half time (min) $k_{YN}$ = Yoon Nelson rate constant (min$^{-1}$) |

*$C_o$ corresponds to the influent concentration (in color unit Pt-Co), $C_t$ corresponds to the effluent concentration at time t (in color unit Pt-Co) and t stands for time (in minutes).

To improve the goodness of fit of the dynamic adsorption models, a method for outlier detection and removal was performed. Detection of outliers from the data sets was accomplished by drawing 95% confidence intervals (CI) around the scatter plots of the effluent concentration (in color units) vs. time (minutes). Outliers outside of the 95% CI were removed from the data sets. Moreover, these steps were performed multiple times after the removal of outliers until all data points were within the 95% CI (Uusipaikka, 2008).

Life Expectancy

For field implementation, it is important to determine the frequency of media replacement after treatment capacity has been exhausted. This can be achieved by formulating life expectancy curves for a range of removal efficiencies (e.g., 40-90%) to treat a volume of color impacted water. To estimate the media's replacement frequency, first the media usage rate (i.e., Eq. 3) is determined according to the target removal efficiency (R). The usage rate (g·L$^{-1}$) specifies the mass of media in grams that can treat 1 L of water based on the desired effluent concentration. As a result, each removal efficiency will have its corresponding usage rate and thus corresponding life expectancy curve. The determination of usage rate employs the influent concentration $C_o$(mg·L$^{-1}$), the average target effluent concentration $C_1$ (mg·L$^{-1}$) (where $C_1=C_0(1-R)$), and the maximum adsorption capacity $q_0$ (mg·g$^{-1}$) selected from the appropriate dynamic adsorption model that can best describe the experimental data collected from column studies. The modeled R is dependent on the reasonable range of color removal obtained from the column exam. To produce the life expectancy curves, a range of volume of treated water $V_{water\ treated}$ (L) is selected to calculate the corresponding range of mass of media required for treatment mass$_{media}$ (g) according to Eq. 4.

Additionally, since the determination of the media's replacement frequency is dependent on the flow rate specified, the design flow rate (Q in L·h$^{-1}$) needs to be first selected by taking into account the maximum flow rate ($Q_{threshold}$ in L·h$^{-1}$) considered as the design threshold and it is preferred for Q to be less than $Q_{threshold}$. Having an understanding of the $Q_{threshold}$ is crucial to prevent possible ponding effect. In this case, gravity is assumed to dominate the flow path contributing to vertical flow as the filter depth is small (i.e., 0.3-0.6 m). Hence the laboratory HRT determined from the column tracer exam is utilized to determine the $Q_{threshold}$ (i.e., Eq. 6) to be representative when scaling from a laboratory examination up to a filed application. To estimate the life expectancy, the void volume or pore space ($V_{void}$ in m$^3$) corresponding to the available water retention capacity in the media is first determined from Eq. 5, using the media mass, media porosity Ø, and density ($\rho_{media}$ in kg·m$^{-3}$). Once the design flow rate (Q) is selected, the surface area of the filter cell is determined from the hydraulic loading rate (HLR in m$^3$/m$^2$ d$^{-1}$) based on the experimental column-exam conditions following Eq. 7. The volume of the cell $V_{Cell}$ (m$^3$) representing the volume occupied by the media is determined according to the area area$_{design}$ (m$^2$) and the depth of cell depth$_{filter}$ (m) (i.e., Eq. 8). Hence, the mass$_{media\ design}$ corresponding to the filter cell dimensions and the density of media, can be calculated according to Eq. 9. Lastly, the life expectancy is calculated from Eq. 10, for a specified media mass (mass$_{media\ design}$) corresponding to filter design and the design flow rate (Q). A design chart can be generated accordingly with a few turning lines to link the target removal efficiency curve with the treated water in volume and the selected mass of media.

$$\text{Usage Rate} = \frac{c_0 - c_1}{q_0} \qquad \text{Eq. (3)}$$

$$V_{water\ treated} = \frac{\text{mass}_{media}}{\text{usage rate}} \qquad \text{Eq. (4)}$$

$$V_{viod} = \text{mass}_{media}(\emptyset)\left(\frac{1}{\rho_{media}}\right) \qquad \text{Eq. (5)}$$

$$Q_{threshold} = \frac{V_{void} * \text{conversion factor}\left(\frac{1000\ L}{1\ m^3}\right)}{HRT} \qquad \text{Eq. (6)}$$

$$\text{area}_{surface} = \frac{Q*\left(\frac{1\ m^3}{1000\ L}\right)}{HLR} \qquad \text{Eq. (7)}$$

$$V_{cell} = \text{area}_{surface} * \text{depth}_{cell} \qquad \text{Eq. (8)}$$

$$\text{mass}_{media\ design} = V_{cell} * \rho_{media} \qquad \text{Eq. (9)}$$

$$\text{Life Expectancy} = V_{design\ water}\left(\frac{1}{Q}\right)*\text{conversion factor}\left(\frac{d}{24\ h}\right) \qquad \text{Eq. (10)}$$

Results and Discussion

The physical characteristics of the five selected sorption media (i.e., CTS, IFGEM-1, IFGEM-4, CPS, and ZIPGEM) are provided below in TABLE 3. Among the selected sorption media, ZIPGEM has the largest surface area (2.55 m$^2$·g$^{-1}$) followed by IFGEM-4, CPS, CTS, and IFGEM-1. Larger surface area can lead to have better adsorption potential (Wang et al., 2014). In terms of porosity CTS has the highest porosity (40.10%) followed by IFGEM-1, ZIP-GEM, CPS, and finally IFGEM-4. The saturated hydraulic conductivity for all media is within the typical range for sand ($10^{-3}$ to $10^{-5}$ m·sec$^{-1}$) (Reddi and Inyang, 2000), indicating appropriateness for field implementation. Finally, the inclusion of ZVI in the sorption media can be associated with the resultant higher density and larger surface area in ZIPGEM contributing to better color removal.

TABLE 3

| Media name | BET Surface Area $(m^2 \cdot g^{-1})$ | Porosity (%) | Density $(g \cdot cm^{-3})$ | Saturated Hydraulic Conductivity $(m \cdot sec^{-1})$ |
|---|---|---|---|---|
| CTS | 0.86 | 40.10 | 2.40 | $2.6 \cdot (10^{-4})$ |
| IFGEM-1 | 0.31 | 36.16 | 2.73 | $2.8 \cdot (10^{-4})$ |
| IFGEM-4 | 2.33 | 25.97 | 3.01 | $1.7 \cdot (10^{-4})$ |
| CPS | 1.08 | 26.48 | 2.61 | $1.7 \cdot (10^{-4})$ |
| ZIPGEM | 2.25 | 29.04 | 2.80 | $2.8 \cdot (10^{-4})$ |

The gradation curves or particle size distribution curves of each sorption media are presented in FIG. 2. The uniformity coefficient ($C_u$) and the coefficient of gradation ($C_c$) are the measures of soil properties and are presented in FIG. 2. For the media mix to be well graded, the value of $C_c$ must range between 1 and 3. The value of $C_c$ of IFGEM-4 is slightly larger than others while all of them are smaller than 2. This implies all five media mixes are poorly graded. Higher value of $C_u$ indicates that the media mix consists of media particles with different size distributions. All the $C_u$ values are below 4 signifying that all sorption media are poorly graded. But CTS has the highest $C_u$ value among the five media mixes. What followed CTS are IFGEM-4, IFGEM-1, ZIPGEM, and CPS.

In addition to physical characterization of the media mixes, samples were evaluated via an XRF analysis to describe the chemical composition of the media mixes, as provided below in TABLE 4. The main chemical element in all mixes was silica (Si), as shown in TABLE 4, provided below. As known in the prior art, amino-functionalized magnetic mesoporous silica can remove tannic acid from aqueous solution by adsorption. (Wang et al., 2010) The second most abundant chemical components for all sorption media mixes, excluding IFGEM-1 is aluminum (Al). The presence of Al as a chemical component in the sorption media mixes can be explained by the inclusion of clay as key ingredient of the mixes (Nayak et al., 2007). Al is utilized for removal of diverse contaminants including nutrients, metals, and contaminants of emerging concern (Nouri et al., 2010; Ordonez et al., 2020; Zaied et al., 2020). The inclusion of recycled ZVI (e.g., 95.6% Fe) as an ingredient of the sorption media for the removal of contaminants is highly promising given its reactivity, large surface area, lower cost, and environmentally friendly nature (Khuntia et al., 2019). Furthermore, K and Ca (e.g., 1-2.5% and/or 0.7-1%) are also part of the chemical composition of the sorption media mixes, and thus, to some extent their presence can aid in a synergistic effect that can be helpful for the removal of contaminants.

TABLE 4

| Compound | CTS | IFGEM-1 | IFGEM-4 | CPS | ZIPGEM |
|---|---|---|---|---|---|
| Al (%) | 8.6 | 10.1 | 2.4 | 9.8 | 9.3 |
| Si (%) | 86.0 | 81.7 | 90.4 | 84.6 | 83.4 |
| P (%) | 1.8 | 1.8 | 1.6 | 1.8 | 1.7 |

TABLE 4-continued

| Compound | CTS | IFGEM-1 | IFGEM-4 | CPS | ZIPGEM |
|---|---|---|---|---|---|
| K (%) | 2.2 | 1.0 | 1.8 | 2.4 | 2.5 |
| Ca (%) | 1.0 | 0.7 | 0.7 | 1.0 | 0.8 |
| Fe (%) | 0.3 | 4.8 | 3.1 | 0.5 | 2.4 |

Images of the media mixtures attained from SEM analysis are presented in FIGS. 3A-3E. The images complement the physical characteristics in providing a visualization of the media mixes at the microscale. The most salient change among the selected sorption media is the color, as the darkish brown tone increases with the increasing concentration of ZVI. Moreover, the media morphology indicates that ZIPGEM particles are the most heterogenous in size and shape which may provide 3-dimensional morphological structures with a higher hydraulic conductivity at the microscale to promote molecular diffusion in a multi-layer structure during an adsorption process. Poorly graded materials with morphological structures would have higher potential to allow dispersion and molecular diffusion to occur in layer-by-layer films during the adsorption process. As known in the art, such a unique process can be formed by the following four steps: (1) mass transfer in a liquid phase via convective mass transfer followed by molecular diffusion; (2) interface diffusion via film diffusion between the liquid phase and the exterior surface of the adsorbent; (3) intrapellet mass transfer through surface diffusion and pore diffusion; and (4) the adsorption-desorption reaction before and after equilibrium. (Crittenden et al., 1986) On the other hand, IFGEM-4 had the higher number of larger particles along with a larger surface area and lower hydraulic conductivity given its higher content of ZVI and better gradation, all prone to form a monolayer structure in an adsorption process.

Figure 4A:
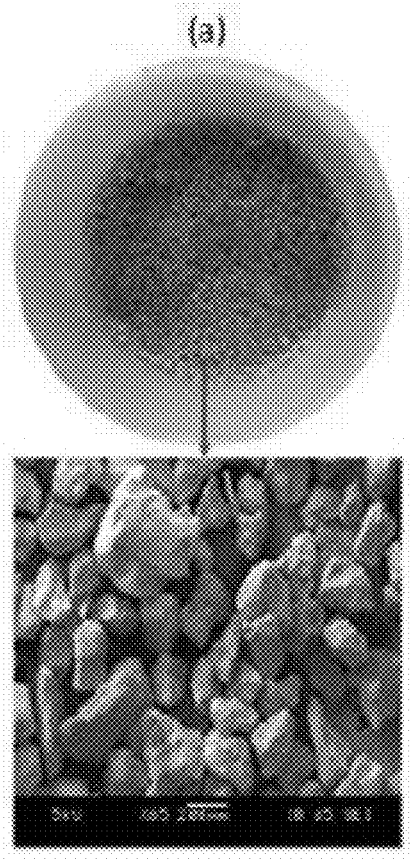
FIG. 4A is a photograph and SEM image of a composition of a media material, sand, according to an embodiment of the present disclosure.
Figure 4B:
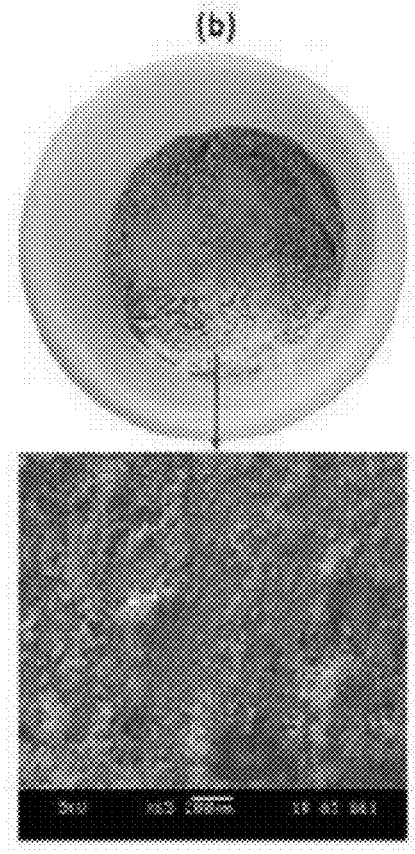
FIG. 4B is a photograph and SEM image of a composition of a media material, clay, according to an embodiment of the present disclosure.
Figure 4C:
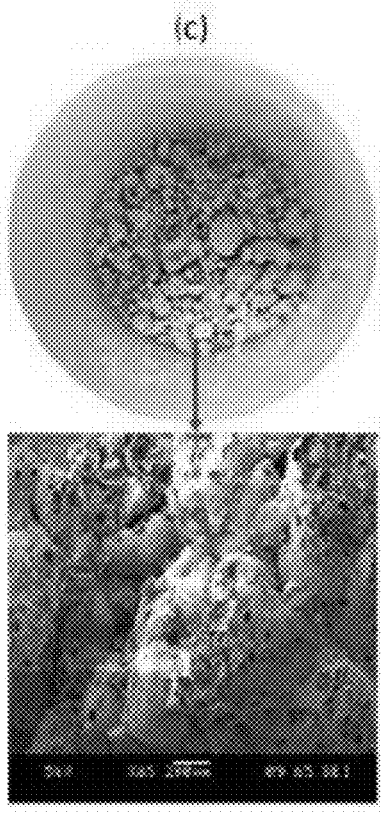
FIG. 4C is a photograph and SEM image of a composition of a media material, perlite, according to an embodiment of the present disclosure.
Figure 4D:
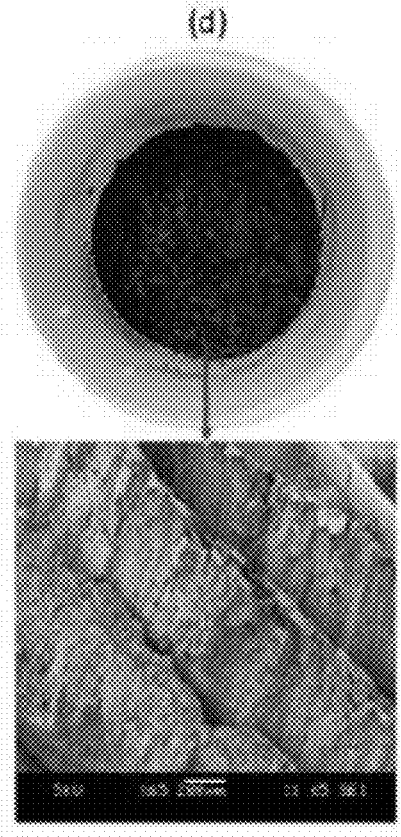
FIG. 4D is a photograph and SEM image of a composition of a media material, ZVI, according to an embodiment of the present disclosure.

To further visualize the physical difference of the sorption media and analyze material morphology, and structure of the key elements of the media materials, SEM images of sand, clay, ZVI, and perlite are presented in FIGS. 4A-4D. When compared to sand and clay in general, ZVI and perlite have greater morphological structure variability. As shown in FIG. 4C and FIG. 4D, perlite exhibits more morphological alterations in nuclei, vacuoles, and shapes suggesting sophisticated surface areas for intraparticle diffusive processes during adsorption. ZVI has surface structural, morphological, and chemical attributes that can aid in oxidation and adsorption by increasing the available contact spaces for water and oxygen. The clay particles exhibit a crystalline structure. Moreover, the smaller particle sizes of clay can overpower the benefits of clay richness in Al if the content of clay in the sorption media is too high, as it can create possible clogging issues due to blockage of the pore spaces of the media. The richness of perlite and sand in Si and Al can provide larger particle size and reduce clogging issues in sorption media. Hence a suitable media mix is critical to further support sorption and adsorption for color removal.

Color Removal Efficiency of Sorption Media

To meet the requirement imposed by the St. John River Management District for source water, color concentration of source water must be less than 40 Pt—Co color units. As the influent water influent concentration is 175±10 Pt—Co units the media needs to achieve about 77% color removal. The results are provided in terms of time (minutes) vs. color removal efficiency (%) and are presented in FIGS. 5A-5J, and the times when the media removal efficiency drop below 77% and the terminal time point of the five media reaching the regulatory limit in this column exam are summarized in TABLE 5, provided below. When comparing the results, as shown in FIG. 5C and FIG. 5D, it is observed that the color removal efficiency for IFGEM-1 was the first one to drop below 77% after 200 minutes, resulting in effluent concentration above the standard (40 Pt—Co color units). Following IFGEM-1, as shown in FIGS. 5A-5B and FIGS. 5E-5J, in ascending order is CPS, CTS, IFGEM-4, and ZIPGEM which maintained appropriate color removal for the first 325, 600, 1,500 and 14,080 minutes respectively, as shown in TABLE 5. While IFGEM-1 was the first one to drop below 77% removal efficiency, it reached terminal time point later than CTS (2,652 minutes), as shown in FIG. 5A and FIG. 5B, and CPS (5,820 minutes), as shown in FIG. 5G and FIG. 5H. The extended breakthrough curve for IFGEM-1 can be associated with the presence of ZVI, which can contribute to color removal by ionic interactions. The benefit of ZVI in some media mixes can be further observed by the results of IFGEM-4, as shown in FIG. 5E and FIG. 5F, obtaining color removals above 77% for about 1,500 minutes. Some of the media reached terminal time point due to ponding issues before the end of the life cycle of media, indicating that the ZVI content in the media might be too high.

The sorption media ZIPGEM, a media mix of ZVI, perlite, clay, and sand stood out at the final stage for the color removal. As shown in FIG. 5I and FIG. 5J, ZIPGEM had the best performance among all the media compositions tested, as effluent concentrations below 40-unit Pt—Co were observed for prolonged times. Additionally, a possible recovery of the adsorption capacity of ZIPGEM around 40,000 minutes was observed when the color removal efficiency increased to ~74.5%. Such phenomenon might be due to the synergetic effects among several different components of ZVI, clay, sand, and perlites. However, ZIPGEM showed ponding and clogging issues at time 52,480 minutes (875 hours), before the media reached the end point of life cycle.

Clogging and ponding may be associated with the ZVI particles undergoing oxidization resulting in iron oxide clogging of the pore space in the media mix and affecting the infiltration negatively. Given that some Al and Fe can be dissolved in water the major tannic acid removal mechanism could be chemical precipitation driven by the formation of solid organometallic complexes, the emergence of Al-tannate can also contribute to clogging issues. The higher the content of ZVI, the larger the chance to have a ponding effect due to accumulation of aluminum and iron salts on the surface of Si (found in sand). The ZVI and Sand ratio were calculated for IFGEM-1, IFGEM-4 and ZIPGEM based on the media matrix, as shown in TABLE 1, resulting in 0.04, 0.11 and 0.071 (ZVI/Sand percent by volume), with these results it can be recommended that, to avoid ponding issues, the ZVI to sand ratio should be less than 0.071. However, since the clogging issue in ZIPGEM occurred long after the media stopped efficiently treating the influent when the color exceeded 40-unit Pt—Co, this issue is not an immediate concern. The strong performance of ZIPGEM can be attributed to a larger surface area and hydraulic conductivity, high porosity, and better morphological structure among the media mixes, with stronger ionic interactions, van der Walls forces, and hydrogen bonding effect.

TABLE 5

| Media name | Mass of media (kg) | Time for the effluent to be <40 Pt-Co (minutes) | Terminal time point (minutes) |
| --- | --- | --- | --- |
| CTS | 1.60 | 600 | 5820 |
| IFGEM-1 | 1.44 | 200 | 11460 |
| IFGEM-4 | 1.84 | 1,500 | [a]4602 |
| CPS | 1.28 | 325 | 2675 |
| ZIPGEM | 1.64 | 14,080 | [a]52,480 |

[a]Terminal time points were reached due to clogging issues.

Removal Mechanism

Tannic acid has a tendency to spontaneously adsorb to different surfaces to yield a hydrophilic coating (Ball and Meyer, 2016). Kaal et al. (2005) suggested the interactions between soil minerals and tannins result in adsorption. Wang et al. (2010) discovered that the adsorption mechanism is heterogeneous, and dependent on pH and ionic strength. Ball et al. (2016) indicated that the adsorption of tannic acid to silicate is completed after about 15 minutes revealing that it produces a thin layer on $SiO_2$. The removal of tannic acids with clay is also related to adsorption. Attapulgite/$CoFe_2O_4$ was developed by Teng et al. (2019) for tannic acid removal, and the main mechanism responsible for the sorption was hydrogen bonding and surface complexation. As mentioned by Amari et al. (2021), however, attapulgite clay coated with chitosan was found to adsorb 95.3 mg $g^{-1}$ of tannic acid driven by electrostatic interactions, hydrogen bonding, and Van der Waals forces (Deng et al., 2012). Furthermore, since the anionic functional groups of tannic acid include hydroxyl and carboxyl groups it can adsorb on oxide surfaces (Zhang et al., 2009). Tannic acid is negatively charged, hence $Ca^{2+}$ can aid to bind negatively charged surfaces such as species of tannic acid (Perez-Benito, 2003; Zhang et al., 2009).

Besides, an Al ion has the possibility of interacting with multiple tannic acid molecules and the formation of insoluble complexes resulting from aluminum compounds such as Al—OH at low and high pH. While at pH between 5-6, when $Al(OH)_3$ is the predominant form, complex formation is replaced by adsorption onto $Al(OH)_3$ surface (Georgantas and Grigoropoulou, 2006). The coprecipitation of tannic acid with $Al(OH)_3$. occurs in the presence of hydrous aluminum oxide (e.g., $Al(OH)_3$) leading to soluble colloidal hydroxy-Al-tannate complexes (Omoike, 1999). In the case of humic substances, Al-humic complexes are formed, and charge neutralization occurs (Georgantas and Grigoropoulou, 2006). Similarly, since tannic acid is a polymeric molecule, it can chelate with $Fe^{3+}$ ions, producing an insoluble complex where the structure is contingent on the solution pH (Al-Mayouf, 1997).

Given the composition of NOM present in natural water, the color removal mechanism encompasses the process of precipitation, charge neutralization, entrapment, adsorption, and complexation with coagulant metal ions into insoluble particles. The reduction in tannic acid in water can also be attained by precipitation leading to the formation of solid complexes which can be separated in processes like coagulation and sedimentation. Omoike (1999) examined the effect of tannic acid on phosphate and organism matter removal during wastewater treatment. Inorganic salts of aluminum or iron are primary coagulants in natural or engineered systems that can hydrolyze to generate insoluble precipitates and entrap particles, neutralizing the charge on the particles. As mentioned previously, accumulation of positively charged aluminum and iron salts (i.e., coagulating metal ions) on the surface of Si given the suitable pH values in water, could also attract negatively charged particles. NOM removal with ferric salts has been reported in a range for 29-70% (Uyak and Toroz, 2007) and NOM can also react with polyvalent metal cations producing soluble metal-NOM complexes (Li et al., 2016).

As shown in FIG. 6, interactions among components in media mixes are. For example, Fe and sand interactions in Fe-oxide coated quartz (i.e., Qtz) sand were explored by Kaal et al. (2005) for tannic acid retention given the potential for tannin-Fe oxide binding. The interactions among the main components (i.e., perlite, clay, sand, and ZVI) of ZIPGEM thus promote efficient color removal. Sand and perlite can work together via the retention of the precipitates (Al-tannin and Fe-tannin complexes) in the porous space while aiding in adsorption. It should be noted that sand, clay, and perlite may share removal mechanisms pertaining to Al and Al—Si bonds given their chemical composition. Furthermore, as shown in FIG. 5I and FIG. 5J, the unique media morphology of ZIPGEM (i.e., the filtration media) helps diffusion and dispersion. Dissolved Al comes from clay and perlite when pH values are appropriate.

Dynamic Adsorption Modeling

The Yoon Nelson model is a kinetic empirical model that allows the estimation of the time needed for the media to reach 50% breakthrough ($\tau$) ($C_t/C_o$=50%). For CTS, IFGEM-1, IFGEM-4, CPS, and ZIPGEM this value was estimated as 2,152, 9,840, 3,382, 1,151 and 62,023 minutes, respectively. Alternatively, Thomas model parameters were selected for comparison as their predictions were consistent having an appropriate r-squared value for all media ($R^2$>0.6). By comparing the $q_o$ it can be observed that ZIPGEM has the highest adsorption capacity (27.1 mg of Pt—Co·g$^{-1}$) among the tested sorption media. Thus, the efficiency of the media can be categorized in descending order based on the adsorption capacities ($q_o$) as ZIPGEM<IFGEM-1<IFGEM-4<CTS<CPS. Furthermore, in comparison to the Thomas model which predictions of $q_o$ for all the media were consistent, the MDR model showed an inconsistent prediction in $q_o$ for ZIPGEM ($q_o$=421.52 mg of Pt—Co·g$^{-1}$. Thus, despite the higher r-squared value for MDR model, it was not selected as the preferred model to estimate the dynamic adsorption capacity, as provided below in TABLE 6.

TABLE 6

| Media | Model | $R^2$ | Parameter |
|---|---|---|---|
| CTS | Thomas | 0.858 | $k_T = 3.94\ (10)^{-6}$ L · mg of Pt-Co$^{-1}$ · min$^{-1}$ $q_0 = 1$ mg of Pt-Co · g$^{-1}$ |
| | MDR | 0.898 | $a_{mdr} = 1.22$ $q_0 = 0.494$ mg of Pt-Co · g$^{-1}$ |
| | Yoon-Nelson | 0.858 | $k_{YN} = 7(10)^{-4}$ min$^{-1}$ $\tau = 2,151.57$ min (1.49 day) |
| IFGEM-1 | Thomas | 0.606 | $k_T = 6\ (10)^{-7}$ L · mg of Pt-Co$^{-1}$ · min$^{-1}$ $q_0 = 4.80$ mg of Pt-Co · g$^{-1}$ |
| | MDR | 0.731 | $a_{mdr} = 0.44$ $q_0 = 2.66$ mg of Pt-Co · g$^{-1}$ |
| | Yoon-Nelson | 0.606 | $k_{YN} = 1.5(10)^{-3}$ min$^{-1}$ $\tau = 9,840$ min (6.83 day) |
| IFGEM-4 | Thomas | 0.939 | $k_T = 5.03\ (10)^{-6}$ L · mg of Pt-Co$^{-1}$ · min$^{-1}$ $q_0 = 1.31$ mg of Pt-Co · g$^{-1}$ |
| | MDR | 0.960 | $a_{mdr} = 1.40$ $q_0 = 0.03$ mg of Pt-Co · g$^{-1}$ |
| | Yoon-Nelson | 0.939 | $k_{YN} = 9(10)^{-4}$ min-1 $\tau = 3,382.33$ min (2.35 day) |

TABLE 6-continued

| Media | Model | $R^2$ | Parameter |
|---|---|---|---|
| CPS | Thomas | 0.928 | $K_T = 8.38\ (10)^{-6}$ L · mg of Pt-Co$^{-1}$ · min$^{-1}$ $q_0 = 0.64$ mg of Pt-Co · g$^{-1}$ |
| | MDR | 0.885 | $a_{mdr} = 1.09$ $q_0 = 0.37$ mg of Pt-Co · g$^{-1}$ |
| | Yoon-Nelson | 0.928 | $k_{YN} = 1.5(10)^{-3}$ min$^{-1}$ $\tau = 1150.73$ min (0.8 day) |
| ZIPGEM | Thomas | 0.676 | $k_T = 1.67(10^{-7}$ L · mg of Pt-Co$^{-1}$ · min$^{-1}$ $q_0 = 27.1$ mg of Pt-Co · g$^{-1}$ |
| | MDR | 0.354 | $a_{mdr} = 0.27$ $q_0 = 421.52$ mg of Pt-Co · g$^{-1}$ |
| | Yoon-Nelson | 0.676 | $k_{YN} = 3(10)^{-5}$ min$^{-1}$ $\tau = 62,023.3$ min (43 day) |

Comparison of ZIPGEM with Other Adsorbents

The advantages of low cost, feasible field application and easy maintenance motivated innovation of different adsorbents, including agricultural waste, activated carbon, activated alumina, and zero-valent iron among the most popular. The color removal using the activated sand showed an efficacy of 70% in the first 3 minutes while the non-modified sand had an efficacy of 40%. More comparisons of different adsorbents for color removal are summarized in TABLE 7.

TABLE 7

| Adsorbent | Adsorbent capacity | Description |
|---|---|---|
| Activated clay | 153 and 28.3 mg · g$^{-1}$ | Tannic acid and humic acid |
| Amino-functionalized magnetic mesoporous silica | 510.2 mg · g$^{-1}$ | Tannic acid |
| Sunflower stalks | 105 and 317 mg · g$^{-1}$ | Methylene and basic red 9 |
| Orange Peel | 19.88 mg · g$^{-1}$ | Aid Violet |
| Citrullus Lanatus rind | 11.9 mg · g$^{-1}$ | Crystal Violet |
| Iron based sludge | 625, 833.34 and 333.34 mg · g$^{-1}$ | Direct blue 71, acid blue 40 and basic violet blue 16. |
| Spherical Fe$_3$O$_4$ nanoparticles | 630 mg · g$^{-1}$ | Congo red dye |
| ZIPGEM | 27.1 mg of Pt-Co · g$^{-1}$ | Color |

Application Potential

Different electrochemical, physicochemical, and photocatalytic methods allow for the removal of dyes for industrial wastewater treatment. In the traditional technology hub, microfiltration, ultrafiltration, and nanofiltration for removal of humic substances have shown potential and can remove 90% of humic acids in water treatment plants (Lowe and Hossain, 2008). The removal of NOM (i.e., tannic and humic acid) by photocatalytic methods is an effective method too. An example is the degradation of dyes, detergents, and organic acids by TiO$_2$ nanofilms (Albu et al., 2007) with the aid of UV light due to their photocatalytic activity (occurring at UV absorbance at the range of 254 nm-370 nm) (Quan et al., 2005, Qaseem et al., 2020). In addition, the removal of tannic acid from wastewater by electrochemical oxidation was confirmed by Govindaraj et al. (2010). However, most of these existing technologies are costly and operationally complex due to regeneration and/or final disposal of sorbents while ZIPGEM can be used as daily coverage at landfills. It is helpful to estimate the replacement frequency upon the exhaustion of all adsorption capacity or reach the threshold (e.g., regulatory limit) to maintain reliable treatment.

Figure 7:
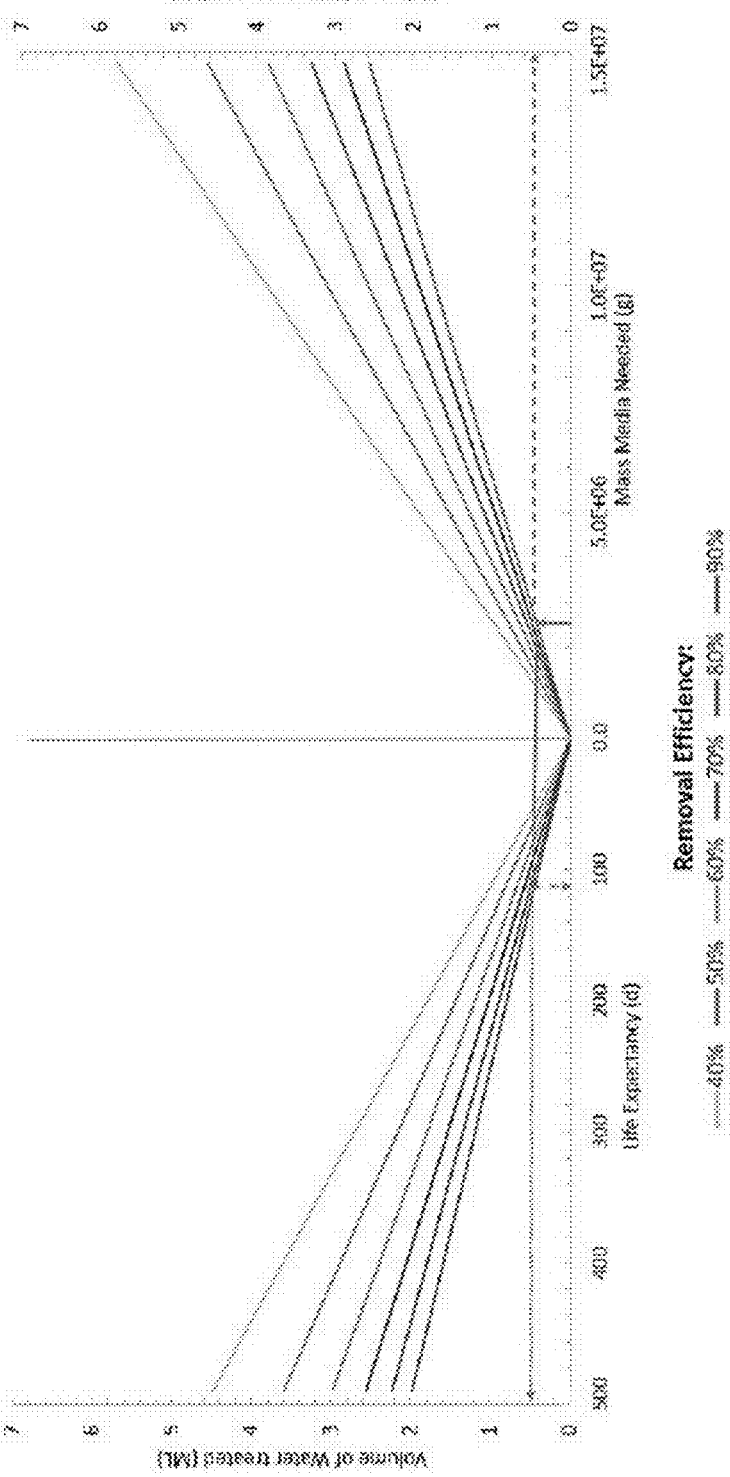
FIG. 7 is a plot illustrating life expectancy curves for volume of water expected to be treated by various masses of ZIPGEM for Co=175±10 units Pt—Co, according to an embodiment of the present disclosure.
Figure 8:
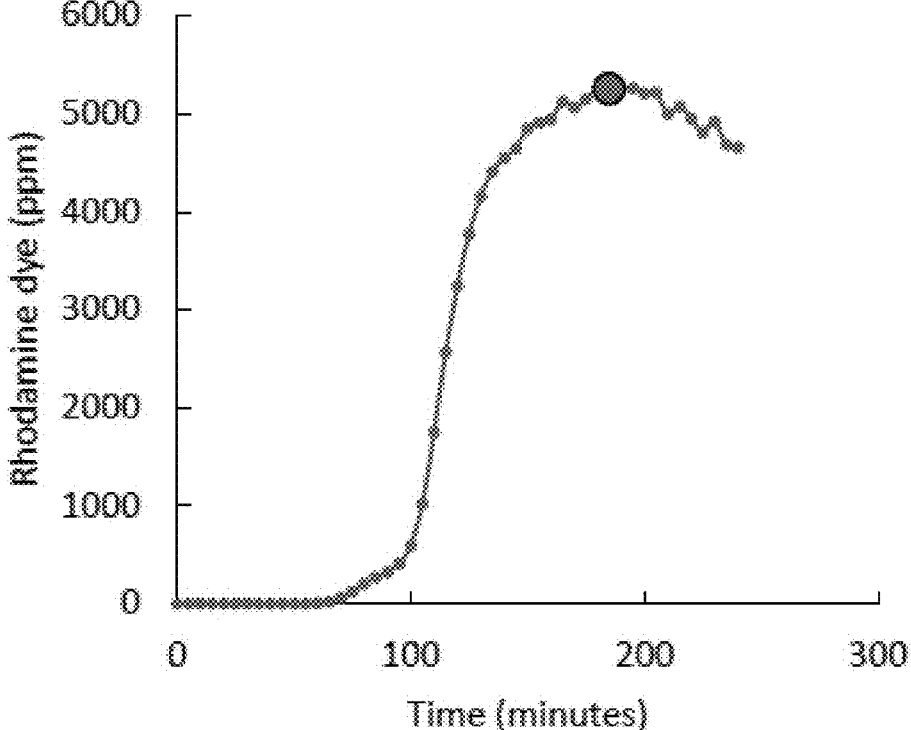
FIG. 8 is a plot illustrating a Rhodamine tracer examination for ZIPGEM based on a 1-ft long 3" diameter column (e.g., 1,200 ml 567 of media) with influent flow rate of 4 ml·min$^{-1}$, according to an embodiment of the present disclosure.

As shown in FIG. 7, the life expectancy assessment curves based on a set of prescribed removal efficiency can be derived to predict the volume of water treated over the media's usage life corresponding to the quantity of media selected. For demonstration, the life expectancy calculation is presented for an application of ZIPGEM in color removal in Lake Brooklyn, FL given the influent condition of 179 color units Pt—Co (e.g., Co). Aiming for a target effluent color concentration at or below 40 color units Pt—Co per SJRWMD requirements (SJRWMD, 2021), the removal efficiency R of 80% is selected for demonstration in this water pretreatment case based on the removal ranges (57-91% color removal as shown), and as shown in FIG. 8, the HRT. By employing the laboratory HRT of 3.7 h for ZIP-GEM and the corresponding laboratory HLR of 31.06 gpd/ ft$^2$ (1.27 m$^3$/(m$^2$ d$^{-1}$)) (Table 2), the maximum flow rate (Q$_{threshold}$) and surface are area$_{surface}$ for the filter cell can be determined. Hence, the maximum flow rate Q$_{threshold}$ of 4.88 (10)$^3$ L·d$^{-1}$ (0.0013 MGD) for a V$_{void}$ of 0.75 m$^3$ was calculated. Reducing the Q$_{threshold}$ by 20% to avoid unexpected flooding or ponding in water treatment filter, a controlled pumping flow rate or design flow rate (Q) of 3.91(10)$^3$ L·d$^{-1}$ (0.0010 MGD) was selected for life expectancy estimation. Based on this controlled pumping flow rate (Q), the corresponding area$_{surface}$ of 3.09 m$^2$ (33.26 ft$^2$) was determined. Note that the selected Q (design flow rate) is a function in terms of HRT, removal efficiency, and adsorption capacity of the adsorbent. For a design filter depth of approximately 0.30 m, a cell volume of 0.88 m$^3$ (31 ft$^3$) was required which corresponds to a design media mass of 2.46(10)$^3$ kg in a treatment cell. The turning-line method, as shown in FIG. 7, provides that following the life expectancy curves can showcase the volume of water treated (V$_{water\ treated}$) over the media useful life corresponding to the quantity of media needed (mass$_{media}$) in a treatment cell. The value to treat a specific volume of water was determined as 0.47 ML (0.12 MG) in such a filter cell from which the estimated life expectancy corresponding to this V$_{design\ water\ treated}$ is 119.21 d (0.33 y) based on approximately 2.5 tons of ZIPGEM.

Risk Assessment

It is important to ensure that implementation of the sorption media as a pretreatment system does not have any side effect that can have any negative health or environmental impact. For instance, the long-term human exposure to aluminum can cause encephalopathy, anemia, and bone disease in dialyzed patients (Colonia and Peris-Sampedro, 2017). Moreover, iron is an essential element for living organisms as it contributes to oxygen transportation and electron transport. Yet, if the iron intake is excessive, it can lead to tissue damage (Abbaspour et al., 2014). The EPA in the US has established standards for iron and aluminum ion concentration under the secondary drinking water standards. Under these standards, the EPA has recommended that the concentration of aluminum and iron in drinking water should not exceed the concentrations of 0.2 and 0.3 mg·L$^{-1}$, respectively. Moreover, the World Health Organization indicated that the aluminum levels in drinking water facilities using aluminum sulfate coagulation ranges from 0.1 to 2.7 mg·L$^{-1}$.

Therefore, effluent samples from each column were analyzed in terms of dissolved aluminum and dissolved iron ion concentration to confirm that there was no harmful leachate with these metals from the sorption media. The results from CTS and CPS, as provided below in TABLE 8 and TABLE 11, respectively, indicate some increase in the dissolved aluminum ion concentration, yet the results did not exceed the concentration of aluminum found previously in drinking waters treated with aluminum sulfate coagulate. On the contrary, IFGEM-1, IFGEM-4 and ZIPGEM, as provided below in TABLE 9, TABLE 10, and TABLE 12, respectively effluents did not contain dissolved aluminum, on the contrary, they provided aluminum removal. Removal was observed in terms of dissolved iron in the ZIPGEM column. In IFGEM-4, iron concentration increase was observed after 69 hours potentially driven by clogging in the column as dissolved iron increased in the effluent.

TABLE 8

| CTS | |
| --- | --- |
| Time (hour) | Dissolved Aluminum ions (mg/L) |
| Influent | 0.3 |
| 37 | 0.4 |
| 81 | 0.4 |
| 128 | 0.4 |

TABLE 9

| IFGEM-1 | | |
| --- | --- | --- |
| Time (hour) | Dissolved Iron ions (mg/L) | Dissolved Aluminum ions (mg/L) |
| Influent | 0.0 | 0.3 |
| 3 | 0.0 | 0.9 |
| 53 | 0.0 | 0.0 |
| 151 | 0.0 | 0.0 |

TABLE 10

| IFGEM-4 | | |
| --- | --- | --- |
| Time (hour) | Dissolved Iron ions (mg/L) | Dissolved Aluminum ions (mg/L) |
| Influent | 1.1 | 0.3 |
| 5 | 0.6 | 0.0 |
| 32 | 1.1 | 0.1 |
| 69 | 3.1 | 0.0 |

TABLE 11

| CPS | |
| --- | --- |
| Time (hour) | Dissolved Aluminum ions (mg/L) |
| Influent | 0.6 |
| 5 | 0.5 |
| 28 | 0.8 |
| — | — |

TABLE 12

| ZIPGEM | | |
| --- | --- | --- |
| Time (hour) | Dissolved Iron ions (mg/L) | Dissolved Aluminum ions (mg/L) |
| Influent | 1.1 | 0.3 |
| 3 | 0.1 | 0.0 |
| 22 | 0.5 | 0.0 |
| 115 | 0.5 | 0.0 |

CONCLUSION

The source water to be utilized for drinking water supply is oftentimes troubled by the presence of NOM (i.e., tannic and humic acid). Adsorption is still one of the most cost-effective treatment methods for the removal of color for drinking water treatment. A low maintenance alternative filtration media was proposed for any in-situ pretreatment of drinking water sources. Five low-cost sorption media were produced and tested by fixed bed column studies to determine the color removal efficiency. Given the influent condition of 175±10 Pt—Co units, the adsorption capacity can be ranked in terms of how long the proposed media sustained the color removal of ~77% or greater. ZIPGEM was ranked the first followed by IFGEM-1, IFGEM-4, CTS, and CPS. ZIPGEM maintained the effluent below 40 Pt—Co units for about 14,000 minutes based on the media mix of 1,200 ml by volume and the prescribed adsorption capacity. Such performance can be attributed to the inclusion of both perlite and ZVI and synergetic effects between clay and sand. With the predicted Thomas model parameter, the adsorption capacity of ZIPGEM (e.g., 27.1 mg of Pt—Co·g⁻¹) was superior to the adsorption capacity of the rest of the four sorption media. Moreover, observed morphology of ZIPGEM shown by SEM indicated a heterogenous surface further supporting the longer duration of color removal observed. Such synergistic interactions among the four components with unique morphological structure promoted color removal by improving physicochemical interactions via better dispersion and diffusion.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

INCORPORATION BY REFERENCE

Abbaspour, N., Hurrell, R., Kelishadi, R., 2014. Review on iron and its importance for human health. Journal of research in medical sciences: the official journal of Isfahan University of Medical Sciences, 19(2), 164.

Ahamed, S., Sperling, J., Stephens, J. C., Arent, D., 2019. The food-energy-water nexus, regional sustainability, and hydraulic fracturing: An integrated assessment of the Denver region. Case Studies in the Environment 3

Al-Mayouf, A., 1997. Corrosion of iron in aqueous solutions containing a chemical cleaning agent. Desalination 114, 29-36.

Alakan, M., Dogan, M., 2001. Adsorption of copper (II) onto perlite. Journal of Colloid and Interface Science 243, 280-291.

Albu, S. P., Ghicov, A., Macak, J. M., Hahn, R., Schmuki, P., 2007. Self-organized, free-standing TiO2 nanotube membrane for flow-through photocatalytic applications. Nano Letters 7, 1286-1289.

Aljeboree, A. M., Alshirifi, A. N., Alkaim, A. F., 2017. Kinetics and equilibrium study for the adsorption of textile dyes on coconut shell activated carbon. Arabian Journal of Chemistry 10, S3381-S3393.

Amari, A., Alzahrani, F. M., Mohammedsaleh Katubi, K., Alsaiari, N. S., Tahoon, M. A., Rebah, F. B., 2021. Clay-polymer nanocomposites: Preparations and utilization for pollutants removal. Materials 14, 1365.

Ball, V., Meyer, F., 2016. Deposition kinetics and electrochemical properties of tannic acid on gold and silica. Colloids and Surfaces A: Physicochemical and Engineering Aspects 491, 12-17.

Bottino, A., Capannelli, C., Del Borghi, A., Colombino, M., Conio, O., 2001. Water treatment for drinking purpose: ceramic microfiltration application. Desalination 141, 75-79.

Chang, M. Y., Juang, R.-S., 2004. Adsorption of tannic acid, humic acid, and dyes from water using the composite of chitosan and activated clay. Journal of Colloid and Interface Science 278, 18-25.

Chang, N. B., Houmann, C., Wanielista, M., 2016. Scaling up adsorption media reactors for copper removal with the aid of dimensionless numbers. Chemosphere 144, 1098-1105.

Chang, N. B., Wen, D., Colona, W., Wanielista, M. P., 2019a. Comparison of biological nutrient removal via two bio-sorption-activated media between laboratory-scale and field-scale linear ditch for stormwater and groundwater co-treatment. Water, Air, & Soil Pollution 230, 151.

Chang, N. B., Wen, D., Wanielista, M. P., 2019b. Impact of changing environmental factors and species competition on iron filings-based green environmental media for nutrient removal in stormwater treatment. Environmental Progress & Sustainable Energy 38.4, 13087

Chassapis, K., Roulia, M., Vrettou, E., Parassiris, A., 2010. Preparation of bioinorganic fertilizing media by adsorption of humates on glassy aluminosilicates. Colloids and surfaces B: Biointerfaces 81, 115-122.

Chatterjee, S., Guha, N., Krishnan, S., Singh, A. K., Mathur, P., Rai, D. K., 2020. Selective and recyclable Congo red dye adsorption by spherical $Fe_3O_4$ nanoparticles functionalized with 1, 2, 4, 5-benzenetetracarboxylic acid. Scientific reports, 10(1), 1-11.

Colomina, M. T., Peris-Sampedro, F., 2017. Aluminum and Alzheimer's disease. Neurotoxicity of metals. 183-197.

Crittenden, J. C., Hutzler, N.J., Geyer, D. G., Oravitz, J. L., Friedman, G., 1986. Model development and parameter sensitivity. Water Resources Research 22(3), 271-284.

Darko, B., Jiang, J. Q., Kim, H., Machala, L., Zboril, R., Sharma, V. K., 2014. Advances made in understanding the interaction of ferrate (VI) with natural organic matter in water. In Water Reclamation and Sustainability, Elsevier, 183-197.

Deng, Y., Wang, L., Hu, X., Liu, B., Wei, Z., Yang, S., Sun, C., 2012. Highly efficient removal of tannic acid from aqueous solution by chitosan-coated attapulgite. Chemical Engineering Journal 181, 300-306.

Dewi, R., Agusnar, H., Alfian, Z., 2018. Characterization of technical kaolin using XRF, SEM, XRD, FTIR and its potentials as industrial raw materials. In Journal of Physics: Conference Series 1116 (4), 042010

Dietrich, A. M., Burlingame, G. A., 2015. Critical review and rethinking of USEPA secondary standards for maintaining organoleptic quality of drinking water. Environmental Science & Technology 49, 708-720.

Dogan, M., Alkan, M., Onganer, Y., 2000. Adsorption of methylene blue from aqueous solution onto perlite. Water, Air, and Soil Pollution 120(3), 229-248.

Dogan, M., Alkan, M., 2003. Removal of methyl violet from aqueous solution by perlite. Journal of Colloid and Interface Science 267, 32-41.

El-Sayed, G. O., 2011. Removal of methylene blue and crystal violet from aqueous solutions by palm kernel fiber. Desalination 272, 225-232.

EPA, 2012. EPA drinking water guidance on disinfection by-products. No. 4 Advice Note Fawell, J., Robinson, D., Bull, R., Birnbaum, L., Boorman, G., Butterworth, B., Daniel, P., Galal-Gorchev, H., Hauchman, F., Julkunen, P., 1997. Disinfection by-products in drinking water: critical issues in health effects research. Environmental Health Perspectives 105, 108-109.

Georgantas, D., Grigoropoulou, H., 2006. Phosphorus and organic matter removal from synthetic wastewater using alum and aluminum hydroxide. Global Nest Journal 8, 121-130.

Ghasemi, M., Keshtkar, A. R., Dabbagh, R., Safdari, S. J., 2011. Biosorption of uranium (VI) from aqueous solutions by Ca-pretreated Cystoseira indica alga: breakthrough curves studies and modeling. Journal of Hazardous Materials 189, 141-149.

Ghribi, A., Chlendi, M., 2011. Modeling of fixed bed adsorption: application to the adsorption of an organic dye. Asian Journal of Textile 1, 161-171.

Gora, S. L., Andrews, S. A., 2017. Adsorption of natural organic matter and disinfection byproduct precursors from surface water onto TiO2 nanoparticles: pH effects, isotherm modelling and implications for using TiO2 for drinking water treatment. Chemosphere 174, 363-370.

Govindaraj, M., Muthukumar, M., Bhaskar Raju, G., 2010. Electrochemical oxidation of tannic acid contaminated wastewater by RuO2/IrO2/TaO2-coated titanium and graphite anodes. Environmental technology, 31(14), 1613-1622.

Hosseini, S. A., Toghroli, A., 2021. Effect of mixing Nano-silica and Perlite with pervious concrete for nitrate removal from the contaminated water. Advances in Concrete Construction 11, 531-544.

Jawad, A. H., Mamat, N., Abdullah, M. F., Ismail, K., 2017. Adsorption of methylene blue onto acid-treated mango peels: kinetic, equilibrium and thermodynamic study. Desalination and Water Treatment 59, 210-219.

Katz, B. G., 1992. Hydrochemistry of the upper Floridan aquifer, Florida. Water-Resources Investigations Report, 91, 4196.

Kaal, J., Nierop, K., Verstraten, J., 2005. Retention of tannic acid and condensed tannin by Fe-oxide-coated quartz sand. Journal of Colloid and Interface Science 287, 72-79.

Katz, B. G., 1992. Hydrochemistry of the upper Floridan aquifer, Florida. Water-Resources Investigations Report, 91, 4196.

Kausar, A., Iqbal, M., Javed, A., Aftab, K., Bhatti, H. N., Nouren, S., 2018. Dyes adsorption using clay and modified clay: a review. Journal of Molecular Liquids, 256, 95-407.

Khuntia, B. K., Anwar, M. F., Alam, T., Samim, M., Kumari, M., Arora, I., 2019. Synthesis and Characterization of Zero-Valent Iron Nanoparticles, and the Study of Their Effect against the Degradation of DDT in Soil and Assessment of Their Toxicity against Collembola and Ostracods. ACS Omega 4, 18502-18509.

Krasner, S. W., McGuire, M. J., Jacangelo, J. G., Patania, N. L., Reagan, K. M., Aieta, E. M., 1989. The occurrence of disinfection by-products in US drinking water. Journal-American Water Works Association 81, 41-53.

Kutser, T., Pierson, D. C., Tranvik, L., Reinart, A., Sobek, S., Kallio, K., 2005. Using satellite remote sensing to estimate the colored dissolved organic matter absorption coefficient in lakes. Ecosystems 8, 709-720.

Li, X.-F., Mitch, W. A., 2018. Drinking water disinfection byproducts (DBPs) and human health effects: multidisciplinary challenges and opportunities. Environmental Science and Technology 52. 4, 1681-1689

Li, Y., Miao, X., Wei, Z., Cui, J., Li, S., Han, R., Zhang, Y., Wei, W., 2016. Iron-Tannic acid nanocomplexes: facile synthesis and application for removal of methylene blue from aqueous solution. Digest Journal of Nanomaterials and Biostructures 11.4, 1045-1061

Lowe, J., Hossain, M. M., 2008. Application of ultrafiltration membranes for removal of humic acid from drinking water. Desalination. 218, 343-354.

Mane, R., Bhusari, V., 2012. Removal of colour (dyes) from textile effluent by adsorption using orange and banana peel. International Journal of Engineering Research and Applications 2, 1997-2004.

Matilainen, A., Vepsalainen, M., Sillanpaa, M., 2010. Natural organic matter removal by coagulation during drinking water treatment: a review. Advances in Colloid and Interface Science 159, 189-197.

Meesuk, L., Seammai, S., 2010. The use of perlite to remove dark colour from repeatedly used palm oil. Journal of the Science Society of Thailand 36, 33-39.

Moussavi, G., Bagheri, A., 2012. Removal of petroleum hydrocarbons from contaminated groundwater by the combined technique of adsorption onto perlite followed by the O3/H2O2 process. Environmental Technology 33, 1905-1912.

Mustafa, Y. A., Ebrahim, S. E., 2010. Utilization of Thomas model to predict the breakthrough curves for adsorption and ion exchange. Journal of Engineering 4, 6206-6223.

Nayak, P. S., Singh, B. K., 2007. Instrumental characterization of clay by XRF, XRD and FTIR. Bulletin of Materials Science, 30(3), 35-238.

Nouri, J., Mahvi, A., Bazrafshan, E., 2010. Application of electrocoagulation process in removal of zinc and copper from aqueous solutions by aluminum electrodes. International Journal of Environmental Research 4, 201-208.

Omoike, A., 1999. Removal of phosphorus and organic matter removal by alum during wastewater treatment. Water Research 33, 3617-3627.

Ordonez, D., Valencia, A., Chang, N.-B., Wanielista, M. P., 2020. Synergistic effects of aluminum/iron oxides and clay minerals on nutrient removal and recovery in water filtration media. Journal of Cleaner Production 275, 122728.

Palmstrom, N. S., Carlson, R. E., Cooke, G. D., 1988. Potential links between eutrophication and the formation of carcinogens in drinking water. Lake and Reservoir Management 4, 1-15.

Perez-Benito, J. F., 2003. Coagulation of colloidal manganese dioxide by divalent cations. Colloids Surfaces A: Physicochemical and Engineering Aspects 225, 145-152.

Prema, P., Thangapandian, S., Selvarani, M., Subharanjani, S., Amutha, C., 2011. Color removal efficiency of dyes using nanozerovalent iron treatment. Toxicological & Environmental Chemistry 93, 1908-1917.

Qaseem, S., Dlamini, D. S., Zikalala, S. A., Tesha, J. M., Husain, M. D., Wang, C., Jiang, Y., Wei, X., Vilakati, G. D., Li, J., 2020. Electro-catalytic membrane anode for dye removal from wastewater. Colloids and Surfaces A: Physicochemical and Engineering Aspects 603, 125270.

Quan, X., Zhao, X., Chen, S., Zhao, H., Chen, J., Zhao, Y., 2005. Enhancement of p, p'-DDT photodegradation on soil surfaces using TiO2 induced by UV-light. Chemosphere 60, 266-273.

Rao, K., Krishnaiah, K., 1994. Colour removal from a dyestuff industry effluent using activated carbon. Indian Journal of Chemical Technology 1.1, 13-19.

Rambabu, K., Bharath, G., Monash, P., Velu, S., Banat, F., Naushad, M., Arthanareeswaran, G. and Show, P. L., 2019. Effective treatment of dye polluted wastewater using nanoporous CaCl2) modified polyethersulfone membrane. Process Safety and Environmental Protection, 124, 266-278.

Reddi, L., Inyang, H. I., 2000. Geoenvironmental engineering: principles and applications. CRC Press. Taylor and Francis Group.

Richardson, S. D., Willson, C. S. and Rusch, K. A., 2004. Use of rhodamine water tracer in the marshland upwelling system. Groundwater. 42(5), 678-688.

Rossatto, D. L., Netto, M. S., Reis, G. S., Silva, L. F., Dotto, G. L., 2021. Volcanic rock powder residues as precursors for the synthesis of adsorbents and potential application in the removal of dyes and metals from water. Environmental Science and Pollution Research, 1-9.

Santos, S. C., Vilar, V. J., Boaventura, R. A., 2008. Waste metal hydroxide sludge as adsorbent for a reactive dye. Journal of Hazardous Materials. 153, 999-1008.

Sharma, A., Syed, Z., Brighu, U., Gupta, A. B., Ram, C., 2019. Adsorption of textile wastewater on alkali-activated sand. Journal of cleaner production, 220, 23-32.

Shengguang, Y., Daying, X., Xiaolong, Y., Jun, Z., 1991. Effect of algae and water on water color shift. Chinese Journal of Oceanology and Limnology 9, 49-56.

Singh, K. P., Mohan, D., Sinha, S., Tondon, G., Gosh, D., 2003. Color removal from wastewater using low-cost activated carbon derived from agricultural waste material. Industrial & Engineering Chemistry Research 42, 1965-1976.

Sivaraj, R., Namasivayam, C., Kadirvelu, K., 2001. Orange peel as an adsorbent in the removal of acid violet 17 (acid dye) from aqueous solutions. Waste management, 21(1), 105-110.

SJRWDM., accessed on: 12.1.2021. St. Johns River Water Management. Water Supply, Florida's aquifer, (sjrwmd-.com).

Suba, V., Rathika, G., 2016. Novel adsorbents for the removal of dyes and metals from aqueous solution-a review. Journal of Advanced Physics 5, 277-294.

Sun, G., Xu, X., 1997. Sunflower stalks as adsorbents for color removal from textile wastewater. Industrial & Engineering Chemistry Research 36, 808-812.

Sun, C., et al., 2017. Adsorption removal of tannic acid from aqueous solution by polyaniline: Analysis of operating parameters and mechanism. Journal of Colloid and Interface Science. 487, 175-181.

Suyamboo, B. K. and Perumal, R. S., 2012. Equilibrium, thermodynamic and kinetic studies on adsorption of a basic dye by Citrullus lanatus rind. Iranica Journal of Energy & Environment, 3(1), 23-34.

Tak, S., Vellanki, B. P., 2018. Natural organic matter as precursor to disinfection byproducts and its removal using conventional and advanced processes: state of the art review. Journal of Water and Health 16, 681-703.

Tara, N., Siddiqui, S. I., Rathi, G., Chaudhry, S. A., Asiri, A. M., 2020. Nano-engineered adsorbent for the removal of dyes from water: A review. Current Analytical Chemistry 16, 14-40.

Teng, Y., Liu, Z., Yao, K., Song, W., Sun, Y., Wang, H., Xu, Y., 2019. Preparation of attapulgite/CoFe2O4 magnetic composites for efficient adsorption of tannic acid from aqueous solution. International Journal of Environmental Research and Public Health 16, 2187.

Uusipaikka, E., 2008. Confidence intervals in generalized regression models. CRC press. Taylor and Francis Group Uyak, V., Toroz, I., 2007. Disinfection by-product precursors reduction by various coagulation techniques in Istanbul water supplies. Journal of Hazardous Materials 141, 320-328.

Vadivelan, V., Kumar, K. V., 2005. Equilibrium, kinetics, mechanism, and process design for the sorption of methylene blue onto rice husk. Journal of Colloid and Interface Science 286, 90-100.

Valencia, A., Chang, N.-B., Wen, D., Ordonez, D., Wanielista, M. P., 2019. Optimal Recipe Assessment of Iron Filing-Based Green Environmental Media for Improving Nutrient Removal in Stormwater Runoff. Environmental Engineering Science 30(10), 1323-1336.

Valencia, A., Zhang, W., Chang, N. B., 2021. Integration of machine learning classifiers and higher order tensors for screening the optimal recipe of filter media in stormwater treatment. Science of the Total Environment 771, 145423.

Wang, J., Zhao, G., Li, Y., Zhu, H., Peng, X., Gao, X., 2014. One-step fabrication of functionalized magnetic adsorbents with large surface area and their adsorption for dye and heavy metal ions. Dalton Transactions 43, 11637-11645.

Wang, J., Zheng, S., Liu, J., Xu, Z., 2010. Tannic acid adsorption on amino-functionalized magnetic mesoporous silica. Chemical Engineering Journal 165, 10-16.

Wang, Y., Joly, S., Morse, D., 2008. Phylogeny of dinoflagellate plastid genes recently transferred to the nucleus supports a common ancestry with red algal plastid genes. Journal of Molecular Evolution 66, 175-184.

Wen, D., Chang, N. B., Wanielista, M. P., 2018. Comparative copper toxicity impact and enzymatic cascade effect on Biosorption Activated Media and woodchips for nutrient removal in stormwater treatment. Chemosphere, 213, 403-413.

Wen, D., Chang, N. B., Wanielista, M. P., 2020. Assessing nutrient removal in stormwater runoff for urban farming with iron filings-based green environmental media. Scientific Reports 10(1), 1-13.

Wong, S., Ghafar, N. A., Ngadi, N., Razmi, F. A., Inuwa, I. M., Mat, R., Amin, N. A. S., 2020. Effective removal of anionic textile dyes using adsorbent synthesized from coffee waste. Scientific Reports 10(1), 1-13.

Wigle, D. T., 1998. Safe drinking water: a public health challenge. Chronic Diseases in Canada 19(3), 103-107.

Yan, M., Wang, D., You, S., Qu, J., Tang, H., 2006. Enhanced coagulation in a typical North-China water treatment plant. Water Research 40, 3621-3627.

Zaied, B., Rashid, M., Nasrullah, M., Zularisam, A., Pant, D., Singh, L., 2020. A comprehensive review on contaminants removal from pharmaceutical wastewater by electrocoagulation process. Science of the Total Environment 726, 138095.

Zhang, L., Jun, M., Xin, L., Shutao, W., 2009. Enhanced removal of organics by permanganate preoxidation using tannic acid as a model compound-Role of in situ formed manganese dioxide. Journal of Environmental Sciences 21, 872-876.

Zhou, X.-F., Liang, J.-P., Zhao, Z.-L., Yuan, H., Qiao, J.-J., Xu, Q.-N., Wang, H.-L., Wang, W.-C., Yang, D.-Z., 2020. Ultra-high synergetic intensity for humic acid removal by coupling bubble discharge with activated carbon. Journal of Hazardous Materials 403, 123626.

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

It is also to be understood that the following claims are intended to cover all of the generic and specific features of the invention herein described, and all statements of the scope of the invention which, as a matter of language, might be said to fall therebetween.

What is claimed is:

1. A filtration media comprising:
at least one silicon atom;
at least one aluminum atom;
at least one zero-valence-iron (hereinafter "ZVI") atom;
wherein the filtration media comprises a composition of at least 85% sand, at most 5% clay, at most 6% ZVI atom, and at most 4% perlite by percent volume;
wherein the ratio of the at least one ZVI atom to the at least one grain of sand is at most 0.071 by percent volume;
wherein the filtration media comprises a surface area of at most 3.00 $m^2 \cdot g^{-1}$;
wherein the filtration media comprises a porosity of at least 29.0% of percent surface area;
wherein the filtration media construct comprises a density of at least 2.50 $g \cdot cm^{-3}$; and
wherein the filtration media comprises a saturated hydraulic conductivity of at least $10^{-5}$ $m \cdot s^{-1}$.

2. The filtration media of claim 1, wherein the filtration media further comprises at least one potassium atom, at least one calcium atom, or both.

3. The filtration media of claim 1, wherein the filtration media comprises a heterogenous morphological structure.

4. The filtration media of claim 1, wherein the filtration media is configured to maintain an effluent concentration below 40 color units of the Platinum-Cobalt Scale (hereinafter "Pt—CO").

5. The filtration media of claim 1, wherein the filtration media is configured to inhibit ponding, clogging, or both within at least one pour of the filtration media for at least 40,000 minutes.

6. The filtration media of claim 1, wherein the filtration media is configured to maintain an adsorption capacity of at least 25.0 mg Pt—Co·g$^{-1}$.

7. A method of optimizing a color removal reaction within a water sample, the method comprising:
incorporating a filtration media into the water sample, the filtration media comprising:
at least one silicon atom;
at least one aluminum atom;

at least one zero-valence-iron (hereinafter "ZVI") atom;
wherein the filtration media comprises a composition of at least 85% sand, at most 5% clay, at most 6% ZVI atom, and at most 4% perlite by percent volume;
wherein the ratio of the at least one ZVI atom to the at least one grain of sand is at most 0.071 by percent volume;
wherein the filtration media comprises a surface area of at most 3.00 $m^2 \cdot g^{-1}$;
wherein the filtration media comprises a porosity of at least 29.0% of percent surface area;
wherein the filtration media construct comprises a density of at least 2.50 $g \cdot cm^{-3}$; and
wherein the filtration media comprises a saturated hydraulic conductivity of at least $10^{-5}$ $m \cdot s^{-1}$; and
wherein the incorporation of the filtration media to the water sample thereof optimizes the color removal reaction within the water sample.

8. The method of claim 7, wherein the filtration media is configured to operate continuously in the water sample for at least 14,000 minutes.

9. The method of claim 7, wherein the filtration media is configured to inhibit ponding, clogging, or both within at least one pour of the aluminum-doped ZVI-quartz construct for at least 40,000 minutes.

10. The method of claim 7, wherein the filtration media configured to maintain an adsorption capacity of at least 25.0 mg of Pt—Co·g$^{-1}$.

11. A method of synthesizing a filtration media, the method comprising:
providing at least one zero-valent iron ("ZVI") material;
mixing the ZVI material with sand, clay, and perlite in proportions of at least 85% sand, at most 5% clay, at most 6% ZVI, and at most 4% perlite by percent volume; and
subjecting the mixture to heat treatment to produce a filtration media having a porosity of at least 29%, a BET specific surface area of at most 3.0 $m^2 \cdot g^{-1}$, a density of at least 2.50 $g \cdot cm^{-3}$, and a saturated hydraulic conductivity of at least $10^{-5}$ $m \cdot s^{-1}$.

12. The method of claim 11, wherein the heat treatment is conducted at a temperature of at least 850° C.

13. The method of claim 11, wherein the heat treatment is configured to promote formation of a heterogeneous morphological structure within the filtration media.

14. The method of claim 11, wherein the filtration media synthesized is configured to inhibit ponding, clogging, or both within at least one pour of the filtration media for at least 40,000 minutes.

* * * * *